United States Patent
Sheppard et al.

(10) Patent No.: US 11,783,354 B2
(45) Date of Patent: Oct. 10, 2023

(54) METHODS AND APPARATUS TO ESTIMATE CENSUS LEVEL AUDIENCE SIZES, IMPRESSION COUNTS, AND DURATION DATA

(71) Applicant: The Nielsen Company (US), LLC, New York, NY (US)

(72) Inventors: Michael R. Sheppard, Holland, MI (US); Dongbo Cui, New York, NY (US); Edward Murphy, Uncasville, CT (US); Jessica Lynn White, Plant City, FL (US); David Forteguerre, Brooklyn, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/408,208

(22) Filed: Aug. 20, 2021

(65) Prior Publication Data
US 2022/0058667 A1 Feb. 24, 2022

Related U.S. Application Data

(60) Provisional application No. 63/068,977, filed on Aug. 21, 2020.

(51) Int. Cl.
G06Q 30/0242 (2023.01)
G06Q 30/0272 (2023.01)
G06Q 30/0201 (2023.01)

(52) U.S. Cl.
CPC ..... *G06Q 30/0201* (2013.01); *G06Q 30/0246* (2013.01); *G06Q 30/0272* (2013.01)

(58) Field of Classification Search
None
See application file for complete search history.

(56) References Cited

U.S. PATENT DOCUMENTS 5,956,692 A  9/1999 Foley
6,029,045 A  2/2000 Picco et al.
(Continued)

FOREIGN PATENT DOCUMENTS

JP  2015529870  10/2015
KR  20160087263  7/2016
(Continued)

OTHER PUBLICATIONS

L Esch, R Kieffer, and T Lopez. Asset and Risk Management: Risk Oriented Finance. Appendix 8 Numerical Methods for Solving Nonlienar equations. 2005. John Wiley & Sons Ltd. [retrieved from internet on Apr. 16, 2022] <URL: https://onlinelibrary.wiley.com/doi/pdf/10.1002/9781118673515.app8> (Year: 2005).*
(Continued)

*Primary Examiner* — Bion A Shelden

(57) ABSTRACT

Methods and apparatus to estimate census level audience sizes, impression counts, and duration data are disclosed. Example instructions cause one or more processor to at least set up a system of equations based on first census data; select a census parameter value based on a constraint for census parameter selection, the constraint based on media access represented in panel data; iteratively solve for second census data that satisfies the system of equations using the panel data and the census parameter value, the second census data including an audience size value, an impression count value, and a duration value for a media item accessed by anonymous audience members in a demographic group; and generate a report including the second census data.

17 Claims, 8 Drawing Sheets

(56) References Cited

U.S. PATENT DOCUMENTS

| | | | |
|---|---|---|---|
| 6,108,637 | A | 8/2000 | Blumenau |
| 6,460,025 | B1 | 10/2002 | Fohn et al. |
| 6,775,663 | B1 | 8/2004 | Kim |
| 7,197,472 | B2 | 3/2007 | Conkwright et al. |
| 7,746,272 | B2 | 6/2010 | Vollath |
| 7,865,916 | B2 | 1/2011 | Beser et al. |
| 7,954,120 | B2 | 5/2011 | Roberts et al. |
| 8,087,041 | B2 | 12/2011 | Fu et al. |
| 8,112,301 | B2 | 2/2012 | Harvey et al. |
| 8,149,162 | B1 | 4/2012 | Pauls |
| 8,171,032 | B2 | 5/2012 | Herz |
| 8,185,456 | B2 | 5/2012 | LeClair et al. |
| 8,200,693 | B2 | 6/2012 | Steele et al. |
| 8,214,518 | B1 | 7/2012 | Bertz |
| 8,370,489 | B2 | 2/2013 | Mazumdar et al. |
| 8,423,406 | B2 | 4/2013 | Briggs |
| 8,453,173 | B1 | 5/2013 | Anderson et al. |
| 8,619,892 | B2 | 12/2013 | Vetter et al. |
| 8,874,652 | B1 * | 10/2014 | Pecjak .............. G06Q 30/0204 709/204 |
| 8,930,701 | B2 | 1/2015 | Burbank et al. |
| 8,973,023 | B1 | 3/2015 | Rao et al. |
| 9,070,139 | B2 | 6/2015 | Zhang |
| 9,094,710 | B2 | 7/2015 | Lee et al. |
| 9,111,186 | B2 | 8/2015 | Blasinski et al. |
| 9,224,094 | B2 | 12/2015 | Oliver et al. |
| 9,236,962 | B2 | 1/2016 | Hawkins et al. |
| 9,237,138 | B2 | 1/2016 | Bosworth et al. |
| 9,420,320 | B2 | 8/2016 | Doe |
| 9,529,836 | B1 | 12/2016 | Hale |
| 10,313,752 | B2 | 6/2019 | Nagaraja Rao et al. |
| 10,382,818 | B2 | 8/2019 | Sheppard et al. |
| 10,609,451 | B2 | 3/2020 | de Andrade et al. |
| 10,681,414 | B2 | 6/2020 | Sheppard et al. |
| 10,743,064 | B2 | 8/2020 | Berezowski et al. |
| 11,115,710 | B2 | 9/2021 | Sheppard et al. |
| 11,140,449 | B2 | 10/2021 | Sullivan et al. |
| 11,216,834 | B2 | 1/2022 | Sheppard et al. |
| 11,323,772 | B2 | 5/2022 | Sheppard et al. |
| 11,425,458 | B2 | 8/2022 | Sheppard et al. |
| 11,438,662 | B2 | 9/2022 | Sullivan et al. |
| 11,483,606 | B2 | 10/2022 | Sheppard et al. |
| 11,523,177 | B2 | 12/2022 | Sheppard et al. |
| 11,553,226 | B2 | 1/2023 | Sheppard et al. |
| 2002/0123928 | A1 | 9/2002 | Eldering et al. |
| 2003/0037041 | A1 | 2/2003 | Hertz |
| 2004/0001538 | A1 | 1/2004 | Garrett |
| 2004/0059549 | A1 * | 3/2004 | Kropaczek .......... G21D 3/001 703/2 |
| 2006/0190318 | A1 | 8/2006 | Downey et al. |
| 2007/0087756 | A1 | 4/2007 | Hoffberg |
| 2008/0028006 | A1 | 1/2008 | Liu et al. |
| 2008/0228543 | A1 | 9/2008 | Doe |
| 2008/0300965 | A1 | 12/2008 | Doe |
| 2008/0313017 | A1 | 12/2008 | Totten |
| 2010/0161385 | A1 | 6/2010 | Karypis et al. |
| 2010/0191723 | A1 | 7/2010 | Perez et al. |
| 2011/0015992 | A1 | 1/2011 | Liffiton et al. |
| 2011/0196733 | A1 | 8/2011 | Li et al. |
| 2012/0023522 | A1 | 1/2012 | Anderson et al. |
| 2012/0052930 | A1 | 3/2012 | McGucken |
| 2012/0066410 | A1 | 3/2012 | Stefanakis et al. |
| 2012/0072940 | A1 | 3/2012 | Fuhrer |
| 2012/0110027 | A1 | 5/2012 | Falcon |
| 2012/0254911 | A1 | 10/2012 | Doe |
| 2013/0138743 | A1 | 5/2013 | Amento et al. |
| 2013/0198125 | A1 | 8/2013 | Oliver et al. |
| 2013/0254787 | A1 | 9/2013 | Cox et al. |
| 2013/0290233 | A1 | 10/2013 | Ferren et al. |
| 2013/0339991 | A1 | 12/2013 | Ricci |
| 2013/0346033 | A1 | 12/2013 | Wang et al. |
| 2014/0101685 | A1 | 4/2014 | Kitts et al. |
| 2014/0112557 | A1 | 4/2014 | Santamaria-Pang et al. |
| 2014/0278933 | A1 | 9/2014 | McMillan |
| 2014/0280891 | A1 | 9/2014 | Doe |
| 2014/0337104 | A1 | 11/2014 | Splaine et al. |
| 2014/0358676 | A1 | 12/2014 | Srivastava et al. |
| 2015/0032310 | A1 | 1/2015 | Zettel et al. |
| 2015/0180989 | A1 | 6/2015 | Seth |
| 2015/0186403 | A1 | 7/2015 | Srivastava et al. |
| 2015/0193813 | A1 | 7/2015 | Toupet et al. |
| 2015/0332310 | A1 | 11/2015 | Cui et al. |
| 2015/0332317 | A1 | 11/2015 | Cui et al. |
| 2016/0012314 | A1 | 1/2016 | Ramamurthy et al. |
| 2016/0086208 | A1 | 3/2016 | Oliver et al. |
| 2016/0134934 | A1 | 5/2016 | Jared et al. |
| 2016/0162955 | A1 | 6/2016 | O'Kelley et al. |
| 2016/0165277 | A1 | 6/2016 | Kirillov et al. |
| 2016/0232563 | A1 | 8/2016 | Perez et al. |
| 2016/0249098 | A1 | 8/2016 | Pecjak et al. |
| 2016/0269783 | A1 | 9/2016 | Mowrer et al. |
| 2016/0323616 | A1 | 11/2016 | Doe |
| 2016/0373820 | A1 | 12/2016 | Meyer et al. |
| 2016/0379246 | A1 | 12/2016 | Sheppard et al. |
| 2017/0006342 | A1 | 1/2017 | Nagaraja Rao et al. |
| 2017/0034594 | A1 | 2/2017 | Francis et al. |
| 2017/0155956 | A1 * | 6/2017 | Nagaraja Rao ...... H04N 21/812 |
| 2017/0187478 | A1 | 6/2017 | Shah et al. |
| 2017/0213243 | A1 | 7/2017 | Dollard |
| 2017/0300911 | A1 | 10/2017 | Alnajem |
| 2018/0073933 | A1 | 3/2018 | Keskin et al. |
| 2018/0189950 | A1 | 7/2018 | Norouzi et al. |
| 2018/0225709 | A1 | 8/2018 | Ferber et al. |
| 2018/0249208 | A1 | 8/2018 | Sheppard et al. |
| 2018/0249210 | A1 | 8/2018 | Sheppard et al. |
| 2018/0249211 | A1 | 8/2018 | Sheppard et al. |
| 2018/0249214 | A1 | 8/2018 | Sullivan et al. |
| 2018/0315060 | A1 | 11/2018 | Sheppard et al. |
| 2018/0332177 | A1 * | 11/2018 | Shah ............... H04N 21/44222 |
| 2018/0376198 | A1 | 12/2018 | Sheppard et al. |
| 2019/0147461 | A1 * | 5/2019 | Sheppard ........... G06Q 30/0201 705/14.41 |
| 2019/0289363 | A1 | 9/2019 | Nagaraja Rao et al. |
| 2019/0354574 | A1 | 11/2019 | Wick et al. |
| 2019/0356950 | A1 | 11/2019 | Sheppard et al. |
| 2019/0370860 | A1 | 12/2019 | Morovati Lopez et al. |
| 2020/0120387 | A1 | 4/2020 | Sheppard et al. |
| 2020/0175546 | A1 | 6/2020 | Perez et al. |
| 2020/0204863 | A1 | 6/2020 | Sullivan et al. |
| 2020/0294069 | A1 | 9/2020 | Sheppard et al. |
| 2020/0296441 | A1 | 9/2020 | Sheppard et al. |
| 2020/0359090 | A1 | 11/2020 | Sheppard et al. |
| 2021/0014564 | A1 | 1/2021 | Sheppard et al. |
| 2021/0058659 | A1 | 2/2021 | Sheppard et al. |
| 2021/0065230 | A1 | 3/2021 | Flynn |
| 2021/0133773 | A1 | 5/2021 | Sheppard et al. |
| 2021/0158377 | A1 | 5/2021 | Sheppard et al. |
| 2021/0319072 | A1 | 10/2021 | Ryan et al. |
| 2021/0319474 | A1 | 10/2021 | Sheppard et al. |
| 2021/0400341 | A1 | 12/2021 | Sheppard et al. |
| 2022/0038781 | A1 | 2/2022 | Sullivan et al. |
| 2022/0058688 | A1 | 2/2022 | Sheppard et al. |
| 2022/0122104 | A1 | 4/2022 | Sheppard et al. |
| 2022/0159326 | A1 | 5/2022 | Sheppard et al. |
| 2022/0264179 | A1 | 8/2022 | Sheppard et al. |
| 2022/0264187 | A1 | 8/2022 | Sheppard et al. |
| 2022/0408154 | A1 | 12/2022 | Sheppard et al. |
| 2023/0042879 | A1 | 2/2023 | Sheppard et al. |
| 2023/0070980 | A1 | 3/2023 | Sullivan et al. |
| 2023/0111617 | A1 | 4/2023 | Sheppard et al. |

FOREIGN PATENT DOCUMENTS

| | | |
|---|---|---|
| WO | 2008127737 A1 | 10/2008 |
| WO | WO2014210597 | 12/2014 |

OTHER PUBLICATIONS

U.S. Appl. No. 10/045,057, filed Aug. 7, 2018, Shah et al.
U.S. Appl. No. 10/070,166, filed Sep. 4, 2018, Chaar et al.
U.S. Appl. No. 10/313,752, filed Jun. 4, 2019, Nagaraja Rao et al.
U.S. Appl. No. 10/491,696, filed Nov. 26, 2019, Gierada.
U.S. Appl. No. 10/602,224, filed Mar. 24, 2020, Sullivan et al.

(56) References Cited

OTHER PUBLICATIONS

U.S. Appl. No. 10/728,614, filed Jul. 28, 2020, Sheppard et al.
U.S. Appl. No. 10/856,027, filed Dec. 1, 2020, Sheppard et al.
Huckett et al., "Combining Methods to Create Synthetic Microdata: Quantile Regression, Hot Deck, and Rank Swapping," Research Gate, Apr. 2008, 11 pages.
Golub et al., "Linear Least Squares and Quadratic Programming," Technical Report No. CS 134, Stanford University, Computer Science Department, May 1969, 38 pages.
Charles L. Byrne, "Iterative Algorithms in Inverse Problems," Apr. 25, 2006, 347 pages.
Charles L. Byrne, "Applied Iterative Methods," Jan. 23, 2007, 396 pages.
Bourguignon et al., "On the Construction of Synthetic Panels," Oct. 2015, 42 pages.
Marno Verbeek,"Pseudo-Panels and Repeated Cross-Sections," The Econometrics of Panel Data, Springer-Verlag Berlin Heidelberg 2008, 15 pages.
P.J.G. Teunissen, "Least-Squares Estimation of the Integer GPS Ambiguities," Delft University of Technology, Department of the Geodetic Engineering, Aug. 1993, 16 pages.
Haggin et al., "Google Nears a Long-Tipped Limit on Tracking "Cookies," in Blow to Rivals," The Wall Street Journal, May 6, 2019, obtained from https://www.wsj.com/articles/googles-new-privacy-tools-to-make-cookies-crumble-competitors-stumble-11557151913, 3 pages.

* cited by examiner

US 11,783,354 B2

METHODS AND APPARATUS TO ESTIMATE CENSUS LEVEL AUDIENCE SIZES, IMPRESSION COUNTS, AND DURATION DATA

RELATED APPLICATION

This patent claims priority to U.S. Provisional Patent Application No. 63/068,977, which was filed on Aug. 21, 2020. U.S. Provisional Patent Application No. 63/068,977 is hereby incorporated herein by reference in its entirety. Priority to U.S. Provisional Patent Application No. 63/068, 977 is hereby claimed.

FIELD OF THE DISCLOSURE

This disclosure relates generally to monitoring media and, more particularly, to methods and apparatus to estimate census level audience sizes, impression counts, and duration data.

BACKGROUND

Traditionally, audience measurement entities have measured audience engagement levels for media based on registered panel members. That is, an audience measurement entity (AME) enrolls people who consent to being monitored into a panel. The AME then monitors those panel members to determine media (e.g., television programs, radio programs, movies, DVDs, advertisements, streaming media, websites, etc.) presented to those panel members. In this manner, the AME can determine exposure metrics for different media based on the collected media measurement data.

Techniques for monitoring user accesses to Internet resources, such as webpages, advertisements and/or other Internet-accessible media, have evolved significantly over the years. Internet-accessible media is also known as online media. Some known systems perform such monitoring primarily through server logs. In particular, entities serving media on the Internet can use known techniques to log the number of requests received at their servers for media.

BRIEF DESCRIPTION OF THE DRAWINGS

The figures are not to scale. In general, the same reference numbers will be used throughout the drawing(s) and accompanying written description to refer to the same or like parts.

Figure 1:
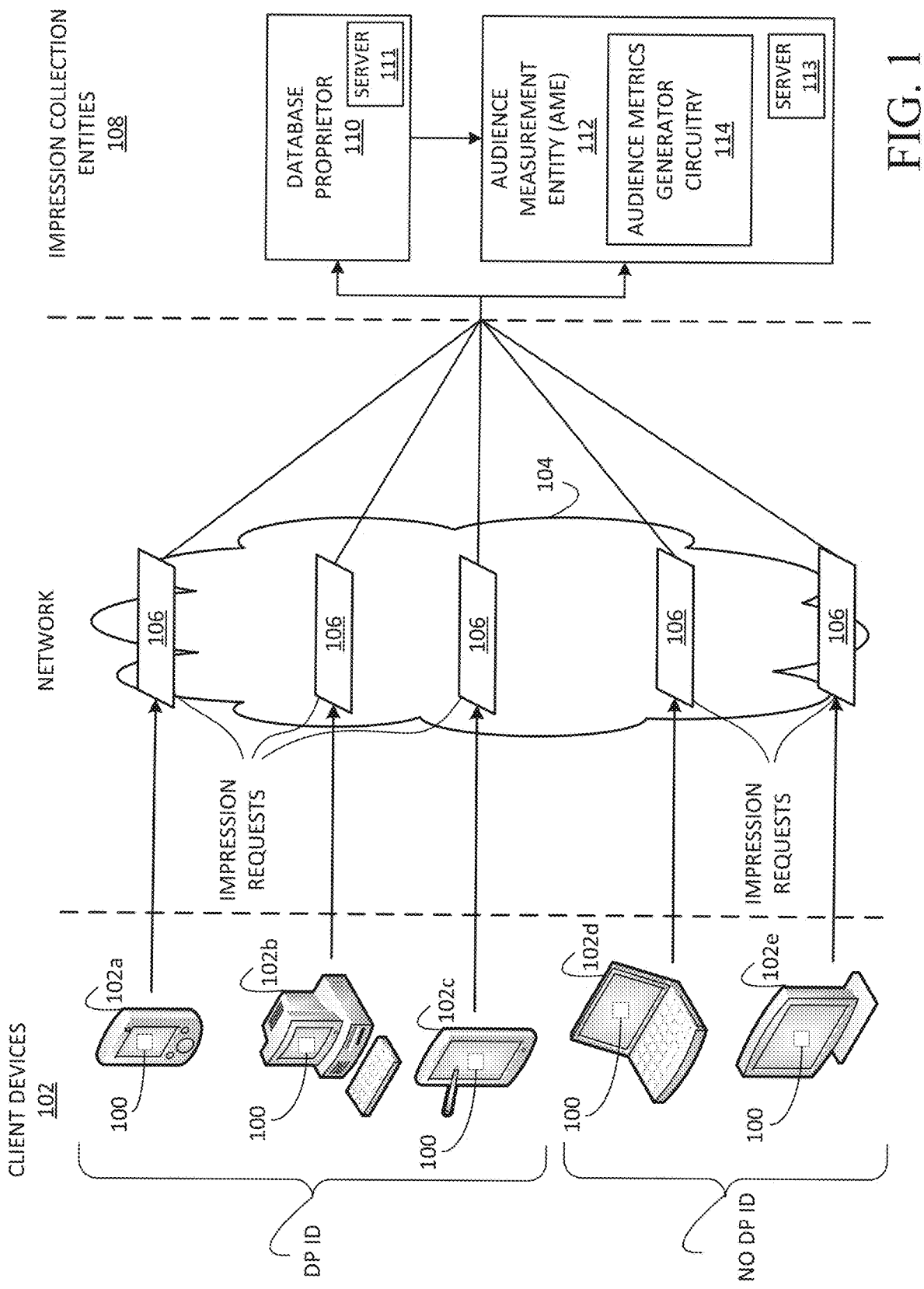
FIG. 1 illustrates example client devices that report impressions of Internet-based media to impression collection entities described in conjunction with examples disclosed herein.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to Internet-accessible media, such as digital television (DTV) media, digital content ratings (DCR) media, websites, advertisements, content, other media, and/or location visits have evolved significantly over the years. Internet-accessible media is also known as online media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device (e.g., a computer, a mobile phone, a tablet computer, a laptop computer, an Internet-connected television, a wearable smart device, etc.) requests the media, both the media and monitoring instructions are downloaded to the client device. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video audio, etc.). In some examples, the impression request or ping request can also include a cookie previously set in the web browser of the client device that may be used to identify a user that accessed the media. That is, impression requests or pings requests cause monitoring data reflecting information about an access to the media to be sent from the client device that downloaded the media to a monitoring entity and can provide a cookie to identify the client device and/or a user of the client device. In some examples, the monitoring entity is an AME that did not provide the media to the client device and who is a trusted (e.g., neutral) third party (e.g., The Nielsen Company, LLC) for providing accurate device usage statistics. Advantageously, because the impression requests are associated with media and executed by the client web browser whenever the media is accessed, the monitoring information is provided to the AME (e.g., via an impression request) irrespective of whether the client device corresponds to a panelist of the AME.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), etc. These database proprietors set cookies and/or other device/user identifiers on the client devices of their subscribers to enable the database proprietors to recognize their subscribers when the subscribers visit websites of the database proprietors.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, the AME is unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar et al. accomplish this task by structuring the AME to respond to impression requests from client devices (that may not correspond to a member of an AME panel and, thus, may be unknown to the AME) by redirecting the client devices from the AME to a database proprietor, such as a social network site partnered with the AME, using an impression response. Such a redirection initiates a communication session between the client device accessing the tagged media and the database proprietor. For example, the impression response received from the AME may cause the client device to send a second impression request to the database proprietor. In response to receiving this impression request, the database proprietor (e.g., Facebook) can access any cookie it has set on the client device to thereby identify the client device based on the internal records of the database proprietor. In the event the client device corresponds to a subscriber of the database proprietor, the database proprietor logs/records a database proprietor demographic impression in association with the user/client device and subsequently forwards logged database proprietor demographic impressions to the AME.

As used herein, panel data corresponds to media exposure data that has been associated with demographics of the users. For example, panel data may include logged and/or recorded database proprietor demographic impressions. Additionally or alternatively, the panel data can correspond to any type of logged and/or recorded demographic impression. As used herein, census data is media exposure data that has not been associated with the demographics of the user(s). Census data typically includes the total aggregate number of media impressions across demographics and/or dimensions (e.g., subgroups of larger groups).

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement or advertisement campaign) has been accessed by a web population (e.g., the number of times the media is accessed). In some examples, an impression or media impression is logged by an impression collection entity (e.g., an AME or a database proprietor) in response to a beacon request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions. A panelist demographic impression is a media impression logged by an AME for which the AME has panelist demographics corresponding to a household and/or audience member exposed to the media. As used herein, a database proprietor demographic impression is an impression recorded by a database proprietor in association with corresponding demographic information provided by the database proprietor in response to a beacon request from a client device of a registered subscriber of the database proprietor.

In the event the client device does not correspond to a subscriber of the database proprietor, the database proprietor may redirect the client device to the AME and/or another database proprietor. If the client device is redirected to the AME, the AME may respond to the redirection from the first database proprietor by redirecting the client device to a second, different database proprietor that is partnered with the AME. That second database proprietor may then attempt to identify the client device as explained above. This process of redirecting the client device from database proprietor to database proprietor can be performed any number of times until the client device is identified and the media exposure logged, or until all database partners have been contacted without a successful identification of the client device. In some examples, the redirections occur automatically so the user of the client device is not involved in the various communication sessions and may not even know they are occurring.

Periodically or aperiodically, the partnered database proprietors provide their logs and demographic information to the AME, which then compiles the collected data into statistical reports identifying audience members for the media.

A user of a client device (e.g., a computer, a mobile device, a tablet computer, a laptop computer, an Internet-connected television, a wearable smart device, etc.) may be exposed to the same media via multiple client devices and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tab (e.g., census measurement science (CMS) tag) executed on the tablet. Multiple logged impression associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than on platform and/or are represented in more than one database of media impressions used to determine the reach of media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to the same media. By tracking exposures to unique audience members, a unique audience measurement may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described technique to track media accesses and to leverage demographic information from database proprietors, use of third-party cookies may be limited to or may cease in some or all online markets. That is, use of third-party cookies enables sharing anonymous personally identifiable information (PII) of audience members across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

In some examples, AMEs may only have access to partial census data (e.g., a total census-level impression count for a single dimension across all demographics or a total census-level impression count for all dimensions across all demographics). As used herein, a dimension is a subgroup of a larger group. For example, a dimension may include a website from a group of websites, a portion (e.g., a 15-minute portion) of media (e.g., a one-hour show), an episode of a series, visits to different stores from a group of stores, etc.

As described above, AMEs previously used third-party cookies to determine the demographic distribution of aggregate census-level impression data. However, because use of third-party cookies may be limited or may be unavailable in some or all online markets, an alternative approach for estimating census-level data across multiple dimensions and demographics based on database proprietor data is useful. Examples disclosed herein estimate census-level unique audience sizes, impression counts, and durations across multiple dimensions and demographics based on complete panel data and/or complete database proprietor data. The panel and/or database proprietor data may include aggregate database proprietor audience sizes, panel and/or database proprietor demographic impression counts, and duration data for each dimension across each demographic. Examples disclosed herein include quantizing the census-level data to produce discrete durations by counting an impression only if the duration lasts at least one time unit. Accordingly, examples disclosed herein may determine a census-level impression count that includes only impressions having a duration greater than or equal to one unit of time based on census-level impression count and duration.

For n dimensions, any individual can be exposed to any combination of media any number of times for any units of time durations such that an impression is counted only when at least one time unit of duration is observed. Below example Table 1 illustrates an aggregation of n dimensions of measurement based on a single demographic, which can be replicated for other demographics.

TABLE 1

Demographic index k, population = $U_{(k)}$

| | Panel | | | Census | | |
|---|---|---|---|---|---|---|
| Dim. | Audience | Impressions | Duration | Audience | Impressions | Duration |
| 1 | $A_{(1, k)}$ | $R_{(1, k)}$ | $D_{(1, k)}$ | $X_{(1, k)}$ | $T_{(1, k)}$ | $V_{(1, k)}$ |
| ... | ... | ... | ... | ... | ... | ... |
| j | $A_{(j, k)}$ | $R_{(j, k)}$ | $D_{(j, k)}$ | $X_{(j, k)}$ | $T_{(j, k)}$ | $V_{(j, k)}$ |
| ... | ... | ... | ... | ... | ... | ... |
| n | $A_{(n, k)}$ | $R_{(n, k)}$ | $D_{(n, k)}$ | $X_{(n, k)}$ | $T_{(n, k)}$ | $V_{(n, k)}$ |
| Total | $A_{(\bullet, k)}$ | $R_{(\bullet, k)}$ | $D_{(\bullet, k)}$ | $X_{(\bullet, k)}$ | $T_{(\bullet, k)}$ | $V_{(\bullet, k)}$ |

In the above example Table 1, the dot (e.g., a bullet) represents an aggregation across an index, shown here across dimensions within a specific demographic. An example of Table 1 with respect to two dimensions and two demographic indices is illustrated below in example Tables 2-4.

TABLE 2

Demographic index 1, population = $U_1$

| | Panel | | | Census | | |
|---|---|---|---|---|---|---|
| Dim. | Audience | Impressions | Duration | Audience | Impressions | Duration |
| 1 | $A_{(1, 1)}$ | $R_{(1, 1)}$ | $D_{(1, 1)}$ | $X_{(1, 1)}$ | $T_{(1, 1)}$ | $V_{(1, 1)}$ |
| 2 | $A_{(2, 1)}$ | $R_{(2, 1)}$ | $D_{(2, 1)}$ | $X_{(2, 1)}$ | $T_{(2, 1)}$ | $V_{(2, 1)}$ |
| Total | $A_{(\cdot, 1)}$ | | | $X_{(\cdot, 1)}$ | | |

TABLE 3

Demographic index 2, population = $U_2$

| | Panel | | | Census | | |
|---|---|---|---|---|---|---|
| Dim. | Audience | Impressions | Duration | Audience | Impressions | Duration |
| 1 | $A_{(1, 2)}$ | $R_{(1, 2)}$ | $D_{(1, 2)}$ | $X_{(1, 2)}$ | $T_{(1, 2)}$ | $V_{(1, 2)}$ |
| 2 | $A_{(2, 2)}$ | $R_{(2, 2)}$ | $D_{(2, 2)}$ | $X_{(2, 2)}$ | $T_{(2, 2)}$ | $V_{(2, 2)}$ |
| Total | $A_{(\cdot, 2)}$ | | | $X_{(\cdot, 2)}$ | | |

TABLE 4

Totals Across Demographics

| | Panel | | | Census | | |
|---|---|---|---|---|---|---|
| Dim. | Audience | Impressions | Duration | Audience | Impressions | Duration |
| 1 | $A_{(1, \cdot)}$ | $R_{(1, \cdot)}$ | $D_{(1, \cdot)}$ | $X_{(1, \cdot)}$ | $T_{(1, \cdot)}$ | $V_{(1, \cdot)}$ |
| 2 | $A_{(2, \cdot)}$ | $R_{(2, \cdot)}$ | $D_{(2, \cdot)}$ | $X_{(2, \cdot)}$ | $T_{(2, \cdot)}$ | $V_{(2, \cdot)}$ |
| Total | $A_{(\cdot, \cdot)}$ | | | $X_{(\cdot, \cdot)}$ | $T_{(\cdot, \cdot)}$ | $V_{(\cdot, \cdot)}$ |

In the above example Tables 1-4, the label "Audience" represents audience size and the label "impressions" represents impression counts. With respect to impressions and durations, the aggregation is ordinary addition as a total. However, with respect to the audience size totals, the aggregation is the unique audience and not the sum of the individual respective audience terms of each dimension, because multiple people could be represented in multiple rows and the overall audience size total is the deduplicated audience size total without double counting an individual (e.g., as represented in the below example Equations 1a-1c)

$$\max_{j}(A_{(j,k)}) \leq A_{(\bullet,k)} \leq \sum_{j=1}^{n} A_{(j,k)} \quad \text{(Equation 1a)}$$

$$R_{(\bullet,k)} = \sum_{j=1}^{n} R_{(j,k)} \quad \text{(Equation 1b)}$$

$$D_{(\bullet,k)} = \sum_{j=1}^{n} D_{(j,k)} \quad \text{(Equation 1c)}$$

Similarly, example Equations 1a-1c are true for census equivalent variables. In example Equations 1a-1c above, A(j,k) represents the panel audience sizes for dimensions (j) across dimensions (k), R(j,k) represents panel impression counts for dimensions (j) across demographics (k), and D(j,k) represents panel impression duration for dimensions (j) across demographics (k). The below example Equations 2a and 2b represent the dot notation for census impressions.

$$T_{(j,\bullet)} = \sum_{k=1}^{K} T_{(j,k)} \quad \text{(Equation 2a)}$$

$$T_{(\bullet,\bullet)} = \sum_{k=1}^{K} T_{(\bullet,k)} = \sum_{j=1}^{n} T_{(j,\bullet)} = \sum_{j=1}^{n} \sum_{k=1}^{K} T_{(j,k)} \quad \text{(Equation 2b)}$$

Example Equation 2a represents the total impressions for the jth dimension, summed across all demographics. In the above-equations T(j,k) represents the census impression counts for dimensions (j) across demographics (k). Example Equation 2b represents the total aggregate impressions across all dimensions and demographics which can be represented equivalently as summing across either bullet totals or double sum across all.

The audience size totals satisfy the below example Equations 3a-3b. The inequality of example Equations 3a-3b is due to the definition of a unique audience.

$$A_{(j,\bullet)} = \sum_{k=1}^{K} A_{(j,k)} \quad \text{(Equation 3a)}$$

$$A_{(\bullet,\bullet)} = \sum_{k=1}^{K} A_{(\bullet,k)} \leq \sum_{j=1}^{n} A_{(j,\bullet)} = \sum_{j=1}^{n} \sum_{k=1}^{K} A_{(j,k)} \quad \text{(Equation 3b)}$$

Examples disclosed herein assume that all the information in the panel/database proprietor are known (e.g., A (panel audience size), R (panel impression count), D (panel impression duration) in Table 1) for all demographics and only partial information is known for the census (e.g., X (census audience size), T (census impression count), V (census impression duration) in Table 1). The solution for the parameters for this maximum entropy problem for a single demographic case a can be determined using discrete durations, as shown below in example Equations 4a-4e.

$$z_j^{(a)} = \frac{A_j^3}{(R_j - A_j)(Q - A_j)(A_j + \Delta R_j)} \quad j = \{1, 2, \ldots, n\} \quad \text{(Equation 4a)}$$

$$z_j^{(i)} = 1 - \frac{A_j}{R_j} \quad j = \{1, 2, \ldots, n\} \quad \text{(Equation 4b)}$$

$$z_j^{(r)} = \frac{\Delta R_j}{A_j + \Delta R_j} \quad j = \{1, 2, \ldots, n\} \quad \text{(Equation 4b)}$$

$$z_\bullet = \frac{Q - A_\bullet}{U - A_\bullet} \quad j = \{1, 2, \ldots, n\} \quad \text{(Equation 4b)}$$

$$z_0 = U - A_\bullet \quad \text{(Equation 4e)}$$

In example Equations 4a-4e, U is the universe of audience members, $\Delta R_j = D_j - R_j$ and Q is defined by the below Equation 5. In the above-equations, z represents the exponents of the Lagrange multipliers of the output for a constrained maximum entropy optimization. The variable Q represents the pseudo universe estimate, also referred to as a counterfactual population. A pseudo universe estimate corresponds to what the size of the universe of individuals capable of being in a given audience would need to be to achieve the audience size totals and reach values for that audience if the different demographics and/or dimensions are assumed to be independent, regardless of how much dependency actually exists among the different audience demographic and/or dimension totals. For example, when the universe of a panel audience is equal to the pseudo universe value, then the total reach of the panel audience can be calculated from the audience demographic and/or dimension totals assuming the audience demographic and/or dimensions totals are independent.

$$1 - \frac{A_\bullet}{Q} = \prod_{j=1}^{n}\left(1 - \frac{A_j}{Q}\right) \quad \text{(Equation 5)}$$

Because an impression can occur when at least one time unit is measured, the domain of the coordinate grid of (i,d) is triangular in nature when d≥i. To overcome the difficulties of the d≥i dependency, examples disclosed herein define a new variable r=d−i where r≥0. The probability distribution can now be defined as p(i, r), which is defined on the rectangular coordinate grid of i=[1, . . . , ∞] and r= {0, . . . , ∞]. Accordingly, the duration variable can be rewritten within the panel of Dj as $D_j = R_j + \Delta R_j$ With $R_j \geq 1$ and $\Delta R_j \geq 0$. The census variables can likewise be rewritten as $\Delta R_j = D_j - R_j$.

To generalize the above equations across multiple demographics, notations used herein may be adjusted. For example, for multiple demographics there are K demographics. Each k demographic has a corresponding solution, two different Qs for each demographic (one for panel and one for census), and the subscripts for {(a), (i), (r)} represent audience sizes, impression counts, and delta-impression labels. Accordingly, each measurement can be indicated by a double subscript, depending on dimension and demographic, with variables encased in parentheses. The subscript indicates the label being represented, as shown below in example Equations 6a-6e.

$$z_{(j,k)}^{(a)} = \frac{A_{(j,k)}^3}{(R_{(j,k)} - A_{(j,k)})(Q_{(j,k)}^{\{A\}} - A_{(j,k)} + \Delta R_{(j,k)})} \quad j = \{1, 2, \ldots, n\} \quad \text{(Equation 6a)}$$

$$z_{(j,k)}^{(i)} = 1 - \frac{A_{(j,k)}}{R_{(j,k)}} \quad j = \{1, 2, \ldots, n\} \quad \text{(Equation 6b)}$$

$$z_{(j,k)}^{(r)} = \frac{\Delta R_{(j,k)}}{A_{(j,k)} + \Delta R_{(j,k)}} \quad j = \{1, 2, \ldots, n\} \quad \text{(Equation 6b)}$$

$$z_k^{(\bullet)} = \frac{Q_{(k)}^{\{A\}} - A_{(\bullet,k)}}{U_k - A_{(\bullet,k)}} \quad j = \{1, 2, \ldots, n\} \quad \text{(Equation 6b)}$$

$$z_k^{(0)} = U_k - A_{(\bullet,k)} \quad \text{(Equation 6e)}$$

In the above example Equations 6a-e, $Q_{(k)}^{\{A\}}$ is defined as the below example Equation 7 with demographic index k.

$$1 - \frac{A_{(\bullet,k)}}{Q_{(k)}^{\{A\}}} = \prod_{j=1}^{n}\left(1 - \frac{A_{(j,k)}}{Q_{(k)}^{\{A\}}}\right) \quad \text{(Equation 7)}$$

A similar equation can be generated for census audience X, with notational change to Q being $Q_{(k)}^{\{A\}}$. An additional notation is to distinguish any of the variables from the panel to the census. The panel is referred to as the prior distributions, with label Q, and census is the posterior, with label P, an additional label are used for the superscript (e.g., $z_{(j,k)}^{\{a,P\}}$ and $z_{(j,k)}^{\{a,Q\}}$).

Examples disclosed herein decrease the difficulty of solving for unknowns in conjunction with the above-illustrated example Equations by solving a more general problem based on impression counts and delta-impression counts for each dimension, summed across all demographics being matched to known census aggregated totals, as shown below in example Equations 8a and 8b.

$$T_{(j,\bullet)} = \sum_{k=1}^{K} T_{(j,k)} \quad j = \{1, 2, \ldots, n\} \quad \text{(Equation 8a)}$$

$$\Delta T_{(j,\bullet)} = \sum_{k=1}^{K} \Delta T_{(j,k)} \quad j = \{1, 2, \ldots, n\} \quad \text{(Equation 8b)}$$

If $T_{(j,k)}$ and $\Delta T_{(j,k)}$ are known, then so is $V_{(j,k)}$. Similarly, if $T_{(j,\cdot)}$ and $\Delta T_{(j,\cdot)}$ are known, then so is $V_{(j,\cdot)}$. Accordingly, if $T_{(j,\cdot)}$ and $V_{(j,\cdot)}$ are known then the problem is identical to the above Equations. For example, for a specific website (dimensions j), where the total aggregate impressions count in the census across the demographics (e.g., $T_{(j,\cdot)}$) is known but not how those impressions are distributed across the demographics themselves, $T_{(j,k)}$. Likewise, for a specific website (dimensions j), where the total aggregate impression durations in the census across the demographics (e.g., $V_{(j,\cdot)}$) is known but not how the durations are distributed across the demographics themselves, $V_{(j,k)}$.

Examples disclosed herein solve for an estimate of audience sizes, impressions counts, and durations for each dimension and each demographic subject to the constraints given in the example Equations 8a and 8b. For the constraints of example Equations 8a and 8b, there is a total of 2n constraints, where each constraint has a Lagrange multiplier associated with it, which must be solved, labeled as $\lambda_{(j)}^{\{T\}}$ and $\lambda_{(j)}^{\{\Delta T\}}$, respectively. The superscript is the label in which category the variable is solving for and the subscript is the numerical index of the dimension.

For the kth demographic, some traditional techniques solve the below example Equations 9a-9d and 10.

$$\log\left(\frac{X_{(j,k)}^3}{(T_{(j,k)} - X_{(j,k)})(Q_{(k)}^{\{X\}} - X_{(j,k)})(X_{(j,k)} + \Delta T_{(j,k)})}\right) - \quad \text{(Equation 9a)}$$

$$\log(z_{(j,k)}^{\{a,Q\}}) = 0$$

$$\log\left(1 - \frac{X_{(j,k)}}{T_{(j,k)}}\right) - \log(z_{(j,k)}^{\{i,Q\}}) = \lambda_{(j)}^{\{T\}} \quad \text{(Equation 9b)}$$

$$\log\left(\frac{\Delta T_{(j,k)}}{X_{(j,k)} + \Delta T_{(j,k)}}\right) - \log(z_{(j,k)}^{\{i,Q\}}) = \lambda_{(j)}^{\{\Delta T\}} \quad \text{(Equation 9c)}$$

$$\log\left(\frac{Q_{(k)}^{\{X\}} - X_{(\bullet,k)}}{U_k - X_{(\bullet,k)}}\right) - \log(z_k^{\{\bullet,Q\}}) = 0 \quad \text{(Equation 9d)}$$

$$1 - \frac{X_{(\bullet,k)}}{Q_{(k)}^{\{X\}}} = \prod_{j=1}^{n}\left(1 - \frac{X_{(j,k)}}{Q_{(k)}^{\{X\}}}\right) \quad \text{(Equation 10)}$$

Although all unknown data can be determined using the above example system of Equations 9a-d with example Equation 10, solving for the unknowns using the example system of Equations 9l-d and example Equation 10 requires a large amount of processor resources and/or memory. Also, the example system of Equations corresponding to Equations 9a-d and 10 does not account for particular constraints. Accordingly, such traditional techniques may result in errors and/or result in audience estimations that are mathematically correct, but realistically incorrect (e.g., impression counts less than audience counts, negative values, errors, etc.). Accordingly, examples disclosed herein perform an analytical iteration-based approach (e.g., using one or more of example Equations 11a-23f) to solve for unknown values that results in mathematically and realistically correct solutions that require less memory and processor resources than traditional techniques.

To realize the analytical-based approach, examples disclosed herein define $c_{(j)}^{\{T\}}$ as $\exp(\lambda_{(j)}^{\{T\}})$ and $c_{(j)}^{\{\Delta T\}}$ as $\exp(\lambda_{(j)}^{\{\Delta T\}})$. Accordingly, examples disclosed herein determine the solution to $X_{(j,k)}$ based on the below example Equations 11a-11e.

$$f_{(j,k)}^{\{T\}} = \left(1 - c_{(j)}^{\{T\}} z_{(j,k)}^{\{i,Q\}}\right)^{-1} \quad \text{(Equation 11a)}$$

$$f_{(j,k)}^{\{\Delta T\}} = \frac{\left(c_{(j)}^{\{\Delta T\}} z_{(j,k)}^{\{r,Q\}}\right)}{1 - \left(c_{(j)}^{\{\Delta T\}} z_{(j,k)}^{\{r,Q\}}\right)} \quad \text{(Equation 11b)}$$

$$f_{(j,k)}^{\{V\}} = f_{(j,k)}^{\{T\}} + f_{(j,k)}^{\{\Delta T\}} \quad \text{(Equation 11c)}$$

$$o_{(j,k)} = \left(z_{(j,k)}^{\{r,Q\}}\right)\left(f_{(j,k)}^{\{T\}} - 1\right)\left(f_{(j,k)}^{\{\Delta T\}} + 1\right) \quad \text{(Equation 11d)}$$

$$X_{(j,k)} = \left(\frac{o_{(j,k)}}{1 + o_{(j,k)}}\right) Q_{(k)}^{\{X\}} \quad \text{(Equation 11e)}$$

In the above equations $f_{(j,k)}^{\{T\}}$ represents the frequency of census impression counts for demographics across dimensions, $f_{(j,k)}^{\{\Delta T\}}$ represents the delta frequency of census impression counts for demographics across dimensions, $f_{(j,k)}^{\{T\}}$ represents the frequency of census impression durations for demographics across dimensions, $o_{(j,k)}$ represents the odds or probability of a person being in individual census audience(s) (e.g., corresponding to dimension and demographic). Example Equation 11e illustrates that $Q_{(k)}^{\{X\}}$ is a function of $X_{(j,k)}$ across the dimensions, as well as the total deduplicated audience $X_{(\cdot,k)}$. Likewise $X_{(\cdot,k)}$ is a function of $Q_{(k)}^{\{X\}}$ and $X_{(j,k)}$ across the dimensions. These equations can be solved based on two additional equations being true. The first equation is the definition of $Q_{(k)}^{\{X\}}$ and the second equation is the invariance of $z_k^{\{\cdot\}}$. Accordingly, the additional constraints on $Q_{(k)}^{\{X\}}$ and $X_{(\cdot,k)}$ are shown in equation Equations 12a and 12b below.

$$1 - \frac{X_{(\bullet,k)}}{Q_{(k)}^{\{X\}}} = \prod_{j=1}^{n}\left(1 - \frac{X_{(j,k)}}{Q_{(k)}^{\{X\}}}\right) \quad \text{(Equation 12a)}$$

$$\frac{Q_{(k)}^{\{X\}} - X_{(\bullet,k)}}{U_k - X_{(\bullet,k)}} = z_k^{\{\bullet,Q\}} \quad \text{(Equation 12b)}$$

The below example Equations 13a-13b result when the definition of $Q_{(k)}^{\{X\}}$ is rephrased.

$$1 - \frac{X_{(\bullet,k)}}{Q_{(k)}^{\{X\}}} = \prod_{j=1}^{n}\left(1 - \frac{X_{(j,k)}}{Q_{(k)}^{\{X\}}}\right) \quad \text{(Equation 13a)}$$

$$= \prod_{j=1}^{n}\left(1 - \frac{o_{(j,k)}}{1 + o_{(j,k)}}\right) \quad \text{(Equation 13b)}$$

$$= \prod_{j=1}^{n}\left(\frac{1}{1 + o_{(j,k)}}\right) \quad \text{(Equation 13c)}$$

$$= \frac{1}{\prod_{j=1}^{n}(1 + o_{(j,k)})} \quad \text{(Equation 13d)}$$

By defining $P_{(k)}$ as $\prod_{j=1}^{n}(1+o_{(j,k)})$, the above example Equations 12a and 12b can be rewritten, as shown below in example Equations 14a and 14b.

$$\frac{Q_{(k)}^{\{X\}}}{Q_{(k)}^{\{X\}} - X_{(\bullet,k)}} = P_k \quad \text{(Equation 14a)}$$

$$\frac{Q_{(k)}^{\{X\}} - X_{(\bullet,k)}}{U_k - X_{(\bullet,k)}} = z_k^{\{\bullet,Q\}} \quad \text{(Equation 14b)}$$

Multiplying both sides by the denominators and re-arranging produces two linear equations with two unknowns (e.g., $Q_{(k)}^{\{X\}}$ and $X_{(\cdot,k)}$), which can be solved based on the below example Equations 15a and 15b.

$$X_{(\bullet,k)} = \left(\frac{(P_k - 1)z_{(k)}^{\{\bullet,Q\}}}{1 + (P_k - 1)z_{(k)}^{\{\bullet,Q\}}}\right) U_k \quad \text{(Equation 15a)}$$

$$Q_{(k)}^{\{X\}} = \left(\frac{P_k z_{(k)}^{\{\bullet,Q\}}}{1 + (P_k - 1)z_{(k)}^{\{\bullet,Q\}}}\right) U_k \quad \text{(Equation 15b)}$$

Example Equations 15a and 15b above are simplified in the below example Equations 16a and 16b by defining $o_{(\cdot,k)}$ as $(P_k - 1)z_{(k)}^{\{\cdot,Q\}}$.

$$X_{(\bullet,k)} = \left(\frac{o_{(\bullet,k)}}{1 + o_{(\bullet,k)}}\right) U_k \quad \text{(Equation 16a)}$$

$$Q_{(k)}^{\{X\}} = \left(\frac{P_k}{P_k - 1}\right) X_{(\bullet,k)} \quad \text{(Equation 16b)}$$

After $X_{(j,k)}$ is calculated, examples disclosed herein can solve for $T_{(j,k)}$ and $V_{(j,k)}$, which completes the solution and derivation of the initial algorithm. Examples disclosed herein result in the follow algorithm for every dimension (j) and demographic (k) from a data set. For the S N parameters (e.g., $c_{(j)}^{\{T\}}$, $c_{(j)}^{\{\Delta T\}}$) which are indexed by dimension (j) but are the same for each demographic, $o_{(j,k)}$ is first calculated for each subscript index as shown below in Equations 17a-d.

$$f_{(j,k)}^{\{T\}} = \left(1 - c_{(j)}^{\{T\}} z_{(j,k)}^{\{t,Q\}}\right)^{-1} \quad \text{(Equation 17a)}$$

$$f_{(j,k)}^{\{\Delta T\}} = \frac{\left(c_{(j)}^{\{\Delta T\}} z_{(j,k)}^{\{r,Q\}}\right)}{1 - \left(c_{(j)}^{\{\Delta T\}} z_{(j,k)}^{\{r,Q\}}\right)} \quad \text{(Equation 17b)}$$

$$f_{(j,k)}^{\{V\}} = f_{(j,k)}^{\{T\}} + f_{(j,k)}^{\{\Delta T\}} \quad \text{(Equation 17c)}$$

$$o_{(j,k)} = \left(z_{(j,k)}^{\{r,Q\}}\right)\left(f_{(j,k)}^{\{T\}} - 1\right)\left(f_{(j,k)}^{\{\Delta T\}} + 1\right) \quad \text{(Equation 17d)}$$

After example Equations 17a-d are solved, examples disclosed herein calculate the demographic estimates of the total unique audiences using the example below Equations 18a-c, which results in the pseudo-universe estimate for each demographic (e.g., $Q_{(k)}^{\{X\}}$), shown in example Equation 19.

$$P_k = \prod_{j=1}^{N}(1 + o_{(j,k)}) \quad \text{(Equation 18a)}$$

$$o_{(\bullet,k)} = (P_k - 1)z_{(k)}^{\{\bullet,Q\}} \quad \text{(Equation 18b)}$$

$$X_{(\bullet,k)} = \left(\frac{o_{(\bullet,k)}}{1 + o_{(\bullet,k)}}\right) U_k \quad \text{(Equation 18c)}$$

$$Q_{(k)}^{\{X\}} = \left(\frac{P_k}{P_k - 1}\right) X_{(\bullet,k)} \quad \text{(Equation 19)}$$

After example Equation 19 is solved, examples disclosed herein can determine the audience size, impression counts, and durations for each dimension (j) for a demographic (k) using the below example Equations 20a-c.

$$X_{(j,k)} = \left(\frac{o_{(\bullet,k)}}{1 + o_{(\bullet,k)}}\right) Q_{(k)}^{\{X\}} \quad \text{(Equation 20a)}$$

$$T_{(j,k)} = \left(f_{(j,k)}^{\{T\}}\right) X_{(j,k)} \quad \text{(Equation 20b)}$$

$$V_{(j,k)} = \left(f_{(j,k)}^{\{V\}}\right) X_{(j,k)} \quad \text{(Equation 20c)}$$

Examples disclosed herein modify the values of $c_{(j)}^{\{T\}}$ and $c_{(j)}^{\{\Delta T\}}$ for $j = \{1, \ldots, N\}$ are modified within the ranges shown in example Equations 21a and 21b, resulting in example Equations 22a and 22b when the 2N constraints are met for all $j = \{1, \ldots, N\}$.

$$0 \leq c_{(j)}^{\{T\}} \leq \min_k\left(\frac{R_{(j,k)}}{R_{(j,k)} - A_{(j,k)}}\right) \quad \text{(Equation 21a)}$$

$$0 \leq c_{(j)}^{\{\Delta T\}} \leq 1 + \min\left(\frac{A_{(j,k)}}{\Delta R_{(j,k)}}\right) \quad \text{(Equation 21b)}$$

$$\sum_{k=1}^{K} T_{(j,k)} = T_{(j,\bullet)} \quad \text{(Equation 22a)}$$

$$\sum_{k=1}^{K} V_{(j,k)} = V_{(j,\bullet)} \quad \text{(Equation 22b)}$$

Example Equations 22a and 22b rephrased version of Equation 8 in terms of impression counts and durations directly. If example Equation 8 is known so are Equations 22a and 22 and vice versa. After the constraints are met, the solutions for the unknown values (e.g., $X_{(j,k)}$, $T_{(j,k)}$, $V_{(j,k)}$) can be determined. Additionally if $T_{(j,\cdot)}$ is not given as a constraint then examples disclosed herein let $c_{(j)}^{\{T\}} = 1$ for all $j = \{1, \ldots, N\}$ and solve for the unknown $c_{(j)}^{\{\Delta T\}}$. Likewise, if $V_{(j,\cdot)}$ is not give as a constraint, examples disclosed herein let $c_{(j)}^{\{V\}} = 1$ for all $j, \ldots, \{1, \ldots, N\}$ and solve for the unknown $c_{(j)}^{\{\Delta V\}}$. If both $V_{(j,\cdot)}$ and $T_{(j,\cdot)}$ are unknown, there is nothing to solve because the solution is that the census numbers match the panel numbers exactly with no change.

In some examples, the above-algorithm (e.g., corresponding to Equations 17a-22b) can be revised for edge cases. An edge case is when, for some dimension j and demographic k, either $A_{(j,k)} = R_{(j,k)}$, $R_{(j,k)} = D_{(j,k)}$, or $A_{(j,k)} = R_{(j,k)} = D_{(j,k)}$. In such examples, one or more of $\{z_{(j,k)}^{\{a,Q\}}, z_{(j,k)}^{\{t,Q\}}, z_{(j,k)}^{\{r,Q\}}\}$ within Equation 9 may diverge to infinity yielding undetermined values for Equation 20. Although the above-algorithm corresponding to example Equations 17a-22a is valid, there is a numerical division by zero in some edge cases. Accordingly, examples disclosed herein adjust the initial algorithm by redefining $o_{(j,k)}$ not as the probability of, but as the probability of not performing algebraic manipulations to avoid any division by zero, as shown in Equations 23a-f (e.g., which are applicable to edge cases and non-edge cases).

$$\mathcal{D}_{(j,k)}^{T} = R_{(j,k)} - \left(c_{(j)}^{\{T\}}\right)(R_{(j,k)} - A_{(j,k)}) \quad \text{(Equation 23a)}$$

$$\mathcal{D}_{(j,k)}^{\Delta T} = A_{(j,k)} - \left(1 - c_{(j)}^{\{\Delta T\}}\right)(R_{(j,k)}) \quad \text{(Equation 23b)}$$

$$f_{(j,k)}^{\{T\}} = \frac{R_{(j,k)}}{\mathcal{D}_{(j,k)}^{T}} \quad \text{(Equation 23c)}$$

-continued $$f_{(j,k)}^{\{\Delta T\}} = \frac{c_{(j)}^{\{\Delta T\}} R_{(j,k)}}{\mathcal{D}_{(j,k)}^T} \quad \text{(Equation 23d)}$$

$$f_{(j,k)}^{\{V\}} = f_{(j,k)}^{\{T\}} + f_{(j,k)}^{\{\Delta T\}} \quad \text{(Equation 23e)}$$

$$o_{(j,k)} = \left(c_{(j)}^{\{T\}}\right)\left(\frac{Q_{(j,k)}^{\{A\}} - A_{(j,k)}}{A_{(j,k)}}\right)\left(\frac{\mathcal{D}_{(j,k)}^T}{A_{(j,k)}}\right)\left(\frac{\mathcal{D}_{(j,k)}^{\Delta T}}{A_{(j,k)}}\right) \quad \text{(Equation 23f)}$$

After solving for the above-variables, examples disclosed herein apply the above variables to example Equations 18a-20c to determine the audience size, impression counts, and durations for that demographic. Additionally, examples disclosed herein can apply the solutions to example Equations 21a-22b to find the parameters. Thus, the rephrased edge version of example Equations 17a-18b are fully incorporated without any worry of a division by zero or having any terms diverge to infinity. The script $\mathcal{D}$ is used herein for notational simplicity and algebraic manipulation causing all expressions to be equally valid across the full spectrum of possible valid inputs. Accordingly, examples disclosed herein are valid for both edge cases and non-edge cases.

FIG. 1 illustrates example client devices 102 that report audience impression requests for Internet-based media to impression collection entities 108 to identify a unique audience size and/or a frequency distribution for the Internet-based media. The illustrated example of FIG. 1 includes the example client devices 102, an example network 104, example impression requests 106, and the example impression collection entities 108. As used herein, an impression collection entity 108 refers to any entity that collects impression data such as, for example, an example AME 112 and/or an example database proprietor 110. In the illustrated example, the AME 112 includes an example audience metrics generator circuitry 114.

The example client devices 102 of the illustrated example may be any device capable of accessing media over a network (e.g., the example network 104). For example, the client devices 102 may be an example mobile device 102a, an example computer 102b, 102d, an example tablet 102c, an example smart television 102e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

The example network 104 is a communications network. The example network 104 allows the example impression requests 106 from the example client devices 102 to the example impression collection entities 108. The example network 104 may be a local area network, a wide area network, the Internet, a cloud, or any other type of communications network.

The impression requests 106 of the illustrated example include information about accesses to media at the corresponding client devices 102 generating the impression requests. Such impression requests 106 allow monitoring entities, such as the impression collection entities 108, to collect a number of media impressions for different media accessed via the client devices 102. By collecting media impressions, the impression collection entities 108 can generate media impression quantities for different media items (e.g., different content and/or advertisement campaigns).

The impression collection entities 108 of the illustrated example include the example database proprietor 110 and the example AME 112. In the illustrated example, the example database proprietor 110 may be one of multiple database proprietors that operate on the Internet to provide services to subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), and/or any other site that maintains user registration records.

In some examples, execution of the beacon instructions corresponding to the media 100 causes the client devices 102 to send impression requests 106 to servers 111, 113 (e.g., accessible via an Internet protocol (IP) address or uniform resource locator (URL)) of the impression collection entities 108 in the impression requests 106. In some examples, the beacon instructions cause the client devices 102 to locate device and/or users identifiers and media identifiers in the impression requests 106. The device/users identifier may be any identifier used to associate demographic information with a user or users of the client devices 102. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) 128 may be used. The media identifiers (e.g., embedded identifiers, embedded codes, embedded information, signatures, etc.) enable the impression collection entities 108 to identify media objects or media items (e.g., the media 100) accessed via the client devices 102. The impression requests 106 of the illustrated example cause the AME 112 and/or the database proprietor 110 to log impressions for the media 100. In the illustrated example, an impression request is a reporting to the AME 112 and/or the database proprietor 110 of an occurrence of the media 100 having been accessed at the client device 102. The impression requests 106 may be implemented as a hypertext transfer protocol (HTTP) request. However, whereas a transmitted HTTP request identifies a webpage or other resource to be downloaded, the impression requests 106 include audience measurement information (e.g., media identifiers and device/user identifier) as its payload. The example server 111, 113 to which the impression requests 106 are directed is programmed to log the audience measurement information of the impression requests 106 as an impression (e.g., a media impression such as advertisement and/or content impressions depending on the nature of the media accessed via the client device 102). In some examples, the server 111, 113 of the database proprietor 101 or the AME 112 may transmit a response based on receiving an impression request 106. However, a response to the impression request 106 is not necessary. It is sufficient for the server 111, 113 to receive the impression request 106 to log an impression request 106.

The example database proprietor 110 maintains user account records corresponding to users registered for services (such as Internet-based services) provided by the database proprietors. That is, in exchange for the provision of services, subscribers register with the database proprietor 110. As part of this registration, the subscribers provide detailed demographic information to the database proprietor 110. Demographic information may include, for example, gender, age, ethnicity, income, home location, education level, occupation, etc. In the illustrated example, the database proprietor 110 sets a device/user identifier on a subscriber's client device 102 that enables the database proprietor 110 to identify the subscriber.

In the illustrated example, the example AME 112 does not provide the media 100 to the client devices 102 and is a trusted (e.g., neutral) third party (e.g., The Nielsen Company, LLC) for providing accurate media access (e.g., exposure) statistics. The example AME 112 includes the example audience metrics generator circuitry 114. As further disclosed herein, the example audience metrics generator circuitry 114 uses known (e.g., previously obtained, determined, and/or estimated) media exposure data from a panel and/or the database proprietor 110 to estimate unknown (e.g., not previously obtained, determined, and/or estimated) media exposure data from census data. For example, the audience size (e.g., the number of audience members), the impression counts, and duration of impressions may previously have been determined and/or obtained at the AME for each demographic and each dimension for the panel and/or database proprietor information. However, the information for the census data may only partially be known (e.g., only the total aggregate number of impressions and/or duration across all demographics and all dimensions have been provided and/or determined by the AME, but not for each demographic and/or dimension). Accordingly, the example audience metrics generator circuitry 114 uses an analytical approach to estimate the unknown census data using the known panel and/or database proprietor data and the known census data. Additionally or alternatively, the example audience metrics generator circuitry 114 may leverage panel data to determine any type of unknown data (e.g., survey data). The example audience metrics generator circuitry 114 is further described below in conjunction with FIG. 2.

In operation, the example client devices 102 employ web browsers and/or applications (e.g., apps) to access media. Some of the web browsers, applications, and/or media include instructions that cause the example client devices 102 to report media monitoring information to one or more of the example impression collection entities 108. That is, when the client device 102 of the illustrated example accesses media, a web browser and/or application of the client device 102 executes instructions in the media, in the web browser, and/or in the application to send the example impression request 106 to one or more of the example impression collection entities 108 via the example network 104. The example impression requests 106 of the illustrated example include information about accesses to the media 100 and/or any other media at the corresponding client devices 102 generating the impression requests 106. Such impression requests 106 allow monitoring entities, such as the example impression collection entities 108, to log media impressions for different media accessed via the example client devices 102. In this manner, the impression collection entities 108 can generate media impression counts for different media (e.g., different content and/or advertisement campaigns).

When the example database proprietor 110 receives the example impression request 106 from the example client device 102, the example database proprietor 110 requests the client device 102 to provide a device/user identifier that the database proprietor 110 had previously set for the example client device 102. The example database proprietor 110 uses the device/user identifier corresponding to the example client device 102 to identify the subscriber of the client device 102 and, thus, demographic information for that subscriber.

In the illustrated example, three of the client devices 102a, 102b, and 102c have DP IDs (DP device/user IDs) that identify corresponding subscribers of the database proprietor 110. In this manner, when the client devices 102a, 102b, 102c corresponding to subscribers of the example database proprietor 110 send impression requests 106 to the impression collection entities 108, the database proprietor 110 may record database proprietor demographic impressions for the user. In the illustrated example, the client devices 102d, 102e do not have DP IDs. As such, the example database proprietor 110 is unable to identify the client devices 102d, 102e due to those client devices not having DP IDs set by the example database proprietor 110. The client devices 102d, 102e may not have DP IDs set by the database proprietor 110 if, for example, the client devices 102d, 102e do not accept cookies, a user does not have an account with the database proprietor 110 or the user has an account with the database proprietor 110 but has cleared the DP ID (e.g., cleared a cookie cache) and deleted the database proprietor's DP ID before or at the time of a media exposure. In such instances, if the user device 102 is, for example, redirected to contact the database proprietor 110 using the system disclosed in Mazumdar et al., U.S. Pat. No. 8,370,489, the database proprietor 110 is not able to detect demographics corresponding to the media exposure and, thus, does not report/log any audience or database proprietor demographic impressions for that exposure. In examples disclosed herein, the client devices 102d, 102e are referred to herein as client devices over which the database proprietor 110 has non-coverage because the database proprietor 110 is unable to identify demographics corresponding to those client devices 102d, 102e. As a result of the non-coverage, the database proprietor 110 underestimates the audience size and number of media impressions (e.g., impression count) for corresponding media accessed via the client devices 102 when, for example, operating within the system of Mazumdar et al., U.S. Pat. No. 8,370,489.

The example AME 112 receives database proprietor demographic impression data from the example database proprietor 110. The database proprietor demographic impression data may include information relating to a total number of the logged database proprietor demographic impressions that correspond with a registered user of the database proprietor 110, a total number of registered users that were exposed to media associated with the logged database proprietor demographic impressions, and/or any other information related to the logged database proprietor demographic impressions (e.g., demographics, a total number of registered users exposed to the media 100 more than once, etc.). The example audience metrics generator circuitry 114 determines missing or unknown census data, survey data, etc. using the known panel data.

Figure 2:
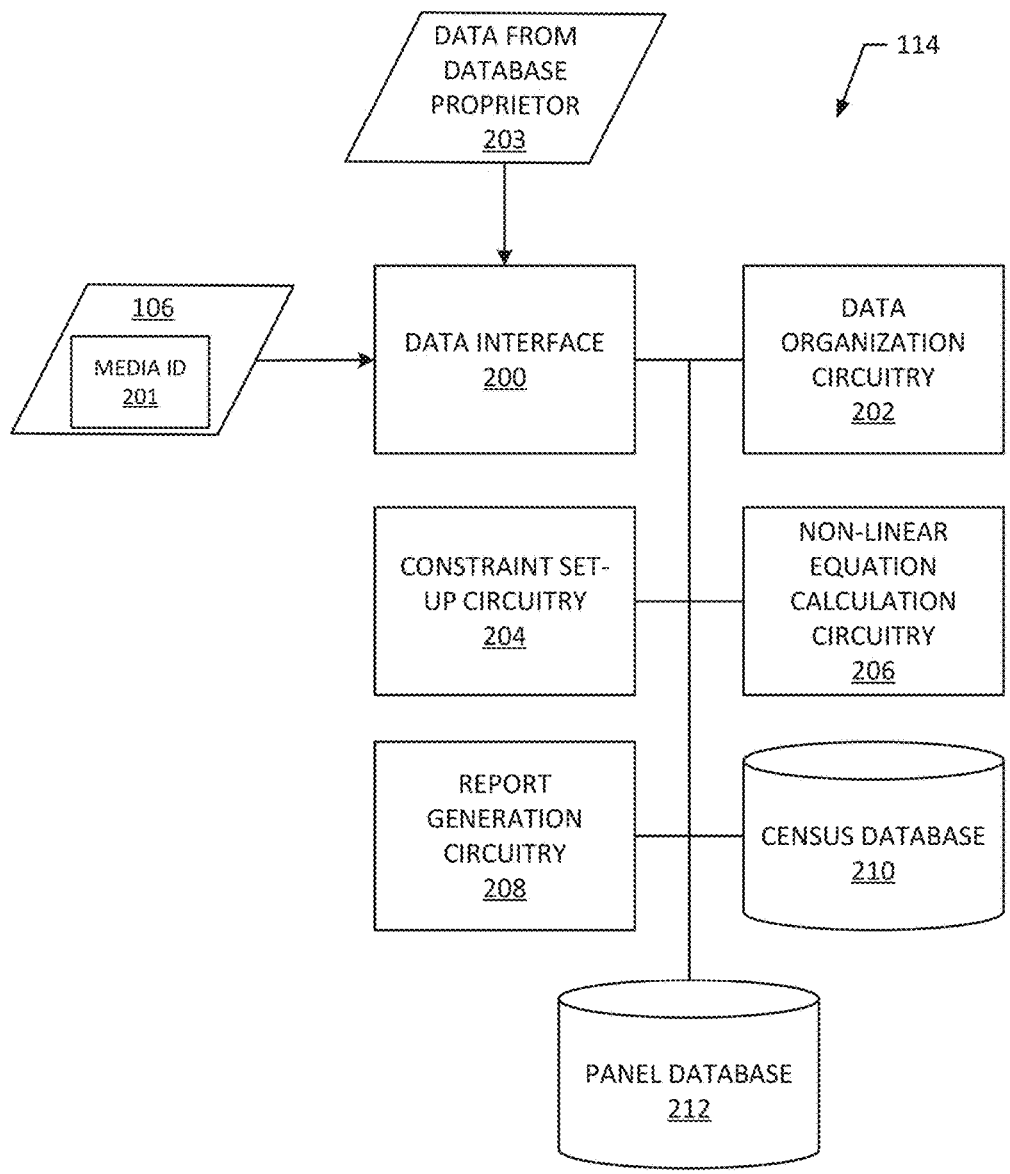
FIG. 2 is a block diagram of the example audience metrics generator circuitry of FIG. 2.

FIG. 2 is a block diagram of the example audience metrics generator circuitry 114 of FIG. 1, disclosed herein, to determine unknown census audience measurement data related to the example impression requests 106 (FIG. 1) and the example database proprietor 110 (FIG. 1) across different dimensions and/or demographics. While the example audience metrics generator circuitry 114 (FIG. 1) is described in conjunction with the example client devices 102 (FIG. 1) and the example impression collection entities 108 (FIG. 1), the example audience metrics generator circuitry 114 may be utilized to determine impression data based on any type of computing device and/or collection entity. The example audience metrics generator circuitry 114 includes an example data interface 200, example data organization circuitry 202, example constraint set-up circuitry 204, example non-linear equation calculation circuitry 206, example report generation circuitry 208, an example census database 210, and an example panel database 212.

The example data interface 200 receives the example impression requests 106 and data from the example database proprietor 103 (e.g., demographic database proprietor impression data). Initially, the example data interface 200 receives an impression request 106 to log an impression. The impression request 106 of the illustrated example includes a media identifier (ID) 201 to identify the example media 100. The example media ID 201 is used to monitor impressions of media 100 and aggregate database proprietor impression data (e.g., database proprietor demographic impressions and/or a partial audience) associated with the media 100. In this manner, audience measurement data corresponding to a panel (e.g., a total number of panelists exposed to the media at different demographics, different dimensions, and/or across demographics; a total number of demographic impressions for the panelists at different demographics, different dimensions, and/or across demographics; and a total duration of exposure to the media for the panelists at different demographics, different dimensions, and/or across demographics) can be determined and stored in the example panel database 212. Additionally, the example data interface 200 may obtain census data. The census data may include aggregate audience sizes, impression counts, and/or duration totals across all demographics and/or dimensions, but may be missing audience size totals, impression count totals, and/or duration totals for a given demographic and/or dimension. The obtained census data is stored in the example census database 210.

The example data organization circuitry 202 of FIG. 2 organizes the known panel data into matrices. For example, the data organization circuitry 202 organizes the panel audience size totals for each dimension and demographic in a first matrix ($A_{(j,k)}$), the panel impression count totals for each dimension and demographic in a second matrix ($R_{(j,k)}$), and the panel duration totals for each dimension and demographic in a third matrix ($D_{(j,k)}$). Additionally, the data organization circuitry 202 organizes the audience size totals for each dimension across all the demographics in a fourth matrix ($A_{(\cdot,-)}$) and the total universe for each demographic in a fifth matrix (U). Additionally, the data organization circuitry 202 organizes the known census data into one or more matrices (e.g., $T_{(-,\cdot)}$, $V_{(-,\cdot)}$, $T_{(\cdot,\cdot)}$, $V_{(\cdot,\cdot)}$, etc.).

The example constraint set-up circuitry 204 of FIG. 2 sets up the constraints based on the census data that is known. For example, the constraint set-up circuitry 204 sets up the constraints using Equations 21a and 22b and 22a and 22b. As further described below, after the constraints are set up, the non-linear equation calculation circuitry 206 can select value(s) within the constraints of FIGS. 21a and 21b. After the value(s) is/are selected, the non-linear equation calculation circuitry 206 uses the selected value(s), the matrices generated by the data organization circuitry 202, and Equations 23a-26c to estimate a total census impression count(s) and durations for each demographic and/or dimension. The data organization circuitry 202 then checks if the estimated information satisfy the Equations 22a and 22b.

The example non-linear equation calculation circuitry 206 of FIG. 2 selects a value for $c_{(j)}^{\{T\}}$ and a value for $c_{(j)}^{\{\Delta T\}}$ within the constraints of Equations 21a and 21b. The non-linear equation calculation circuitry 206 uses the selected value and the matrices generated by the data organization circuitry 202 to solve for the census audience size totals, census impression count totals, and census duration totals for any unknown (e.g., each dimension, each demographic, and/or for each dimension across demographics) using Equations 18a-c, 19, 20a-c, and 23a-f. Initially, the example non-linear equation calculation circuitry 206 may need to determine the constraints for Equation 21a-21b by determining $$\min_k\left(\frac{R_{(j,k)}}{R_{(j,k)} - A_{(j,k)}}\right)$$

$$1 + \min\left(\frac{A_{(j,k)}}{\Delta R_{(j,k)}}\right)$$

where $\Delta R_{(j,k)}$ is a function of $D_{(j,k)}$, as explained above. After the selected values for $c_{(j)}^{\{T\}}$ and $c_{(j)}^{\{\Delta T\}}$ are applied to equations 18a-c, 19, 20a-c, and 23a-f, the example non-linear equation calculation circuitry 206 applies the determined census impression count totals ($T_{(j,k)}$) and census duration totals ($V_{(j,k)}$) to equations 22a-22b to see if the determined information satisfy the system of Equations 22a-22b. If the example non-linear equation calculation circuitry 206 determines that the census impression count totals and the census duration totals satisfy Equations 22a-22b, then the example non-linear equation calculation circuitry 206 outputs the determined census audience size totals, census impression count totals, and/or census duration totals. If the example non-linear equation calculation circuitry 206 determines that the census impression count totals and the census duration totals do not satisfy Equations 22a-22b, then the example non-linear equation calculation circuitry 206 adjusts the selected value for $c_{(j)}^{\{T\}}$ and $c_{(j)}^{\{\Delta T\}}$ and performs additional iteration(s) until the determined census impression count totals and the census duration totals satisfy Equations 22a-22b.

The example report generation circuitry 208 of FIG. 2 generates reports based on the various statistics calculated by the example non-linear equation calculation circuitry 206. The report may include the total number of audience members, total number of impressions, and/or total duration of the impressions per demographic, per dimension, and/or across demographics and/or dimensions (e.g., aggregate totals) corresponding to the census data. The report may be a report to display on a user interface and/or may be included in a data structure to be stored and/or transmitted to an external device.

In some examples, the audience metrics generator circuitry 114 includes means for determining unknown census data. For example, the means for determining may be implemented by the example data interface 200, the example data organization circuitry 202, the example constraint set-up circuitry 204, the example non-linear equation calculation circuitry 206, the example report generation circuitry 208, the example census database 210, and the example panel database 212. In some examples, the audience metrics generator circuitry 114 may be implemented by machine executable instructions such as that implemented by FIGS. 3A and 3B executed by processor circuitry, which may be implemented by the example processor circuitry 412 of FIG. 4, the example processor circuitry 500 of FIG. 5, and/or the example Field Programmable Gate Array (FPGA) circuitry 600 of FIG. 6. In other examples, the audience metrics generator circuitry 114 is implemented by other hardware logic circuitry, hardware implemented state machines, and/or any other combination of hardware, software, and/or firmware. For example, the audience metrics generator circuitry 114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for determining the unknowns includes means for obtaining panel data and census data (e.g., the data interface 200), means for organizing panel data into matrices and/or organizing known census data into matrices (e.g., the example data organization circuitry 202), means for setting up the census constraint(s) for the census parameters(s) and/or setting up the census system of equations based on known census data (e.g., means for constraint set-up circuitry 204), means for selecting value(s); determining duration frequencies; determining odd(s); determining pseudo universe estimates(s); determining audience size totals; determining impression count total; determining census duration totals; applying census totals to the census system of equations; determining whether the census totals satisfies the census system of equations; and solving remaining knowns (e.g., the non-linear equation calculation circuitry 206), means for generating a report (e.g., the report generation circuitry 208), means for storing census data (e.g., the census database 210), and means for storing panel database (e.g., the panel database 212).

While an example manner of implementing the audience metrics generator circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the data interface 200, the example data organization circuitry 202, the example constraint set-up circuitry 204, the example non-linear equation calculation circuitry 206, the example report generation circuitry 208, and/or, more generally, the example audience metrics generator circuitry 114 of FIG. 2, may be implemented by hardware, software, firmware, and/or any combination of hardware, software, and/or firmware. Thus, for example, any of the data interface 200, the example data organization circuitry 202, the example constraint set-up circuitry 204, the example non-linear equation calculation circuitry 206, the example report generation circuitry 208, and/or, more generally, the example audience metrics generator circuitry 114 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the data interface 200, the example data organization circuitry 202, the example constraint set-up circuitry 204, the example non-linear equation calculation circuitry 206, and the example report generation circuitry 208 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audience metrics generator circuitry 114 of FIG. 2 may include one or more elements, processes, and/or devices in addition to, or instead of, those illustrated in FIG. 2, and/or may include more than one of any or all of the illustrated elements, processes, and devices.

Figure 3A:
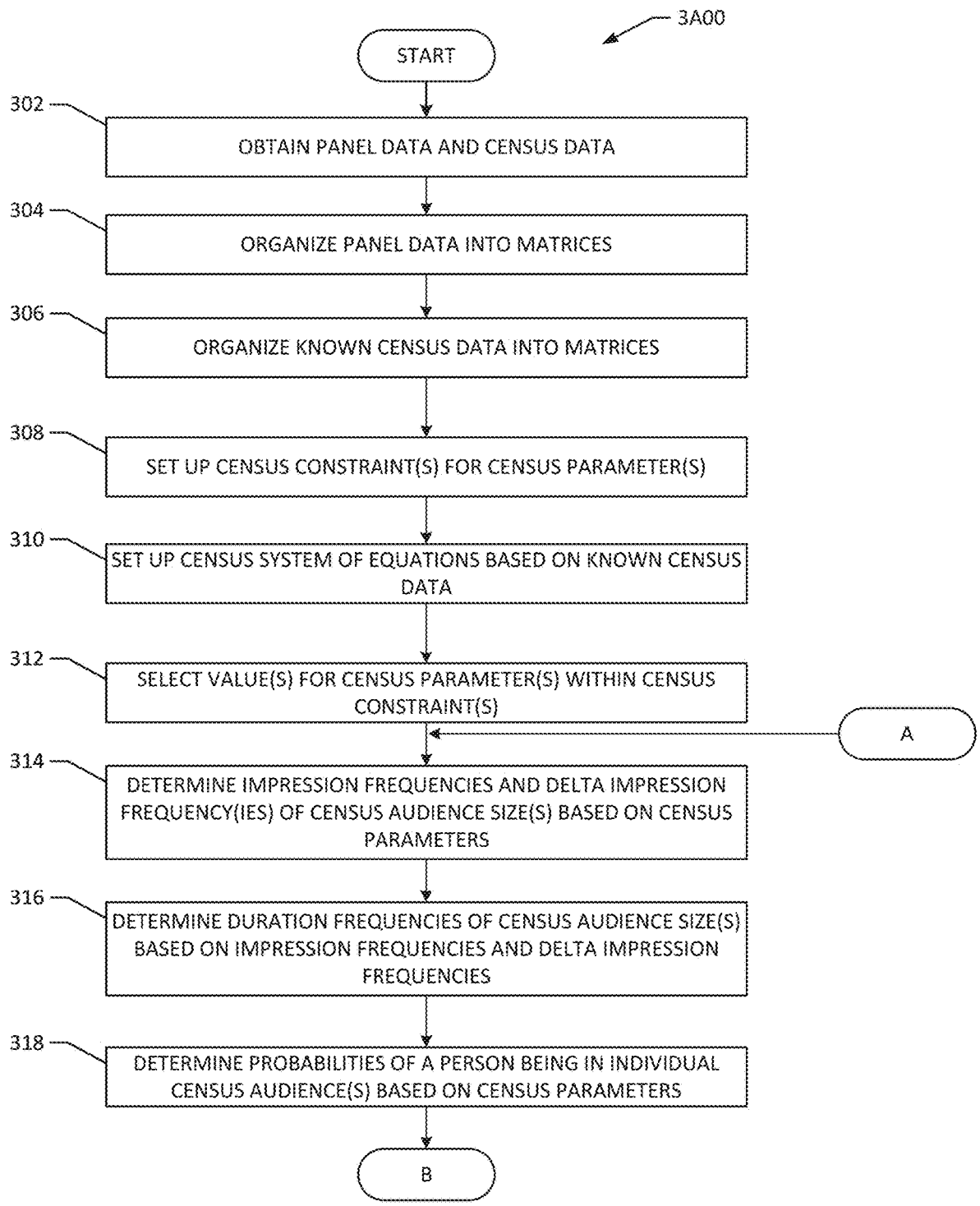
FIGS. 3A and 3B illustrate a flowchart representative of example machine readable instructions that may be executed to implement the example audience metrics generator circuitry of FIG. 2 to determine unknown census data based on panel data.
Figure 3B:
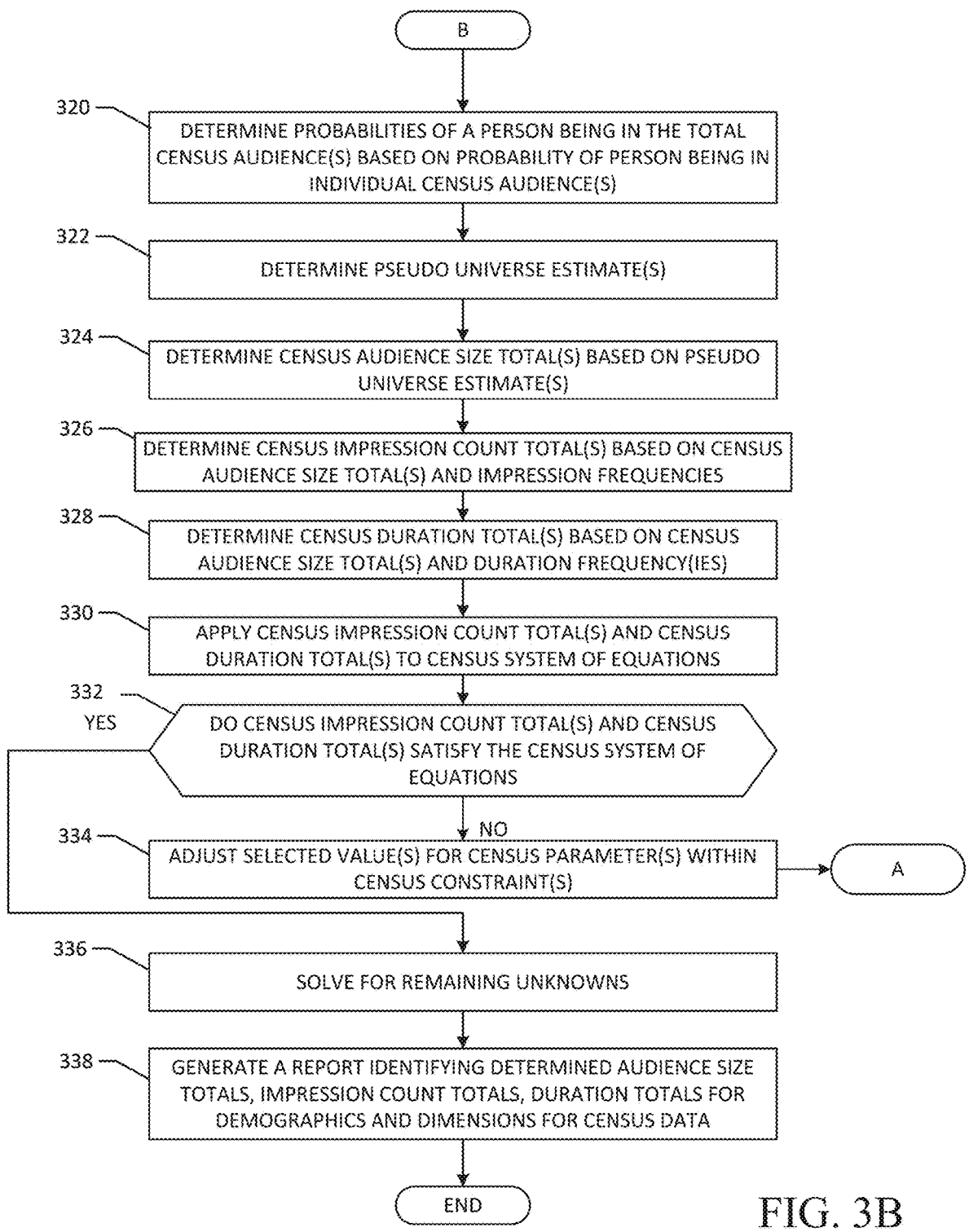

A flowchart representative of example hardware logic circuitry, machine readable instructions, hardware implemented state machines, and/or any combination thereof for implementing the example audience metrics generator circuitry 114 of FIG. 2 is shown in FIGS. 3A and 3B. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example audience metrics generator circuitry 114 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3A and 3B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The example machine readable instructions 300 illustrated in FIGS. 3A and 3B may be executed to implement the audience metrics generator circuitry 114 of FIG. 2 to determine unknown census data for audience members that access one or more media items (e.g., one or more dimensions via client devices (e.g., the client devices 102 of FIG. 1). Although examples disclosed herein determine unknown census data based on known database proprietor/panel data, the instructions 300 may be used to determine any unknown data (e.g., return path data, incomplete database proprietor data, etc.) based on known data (e.g., panelist data, survey data, etc.).

Initially, at block 302 of FIG. 3, the example data interface 200 (FIG. 2) obtains panel data from the example panel database 212 (FIG. 2) and census data from the example census database 210 (FIG. 2). The panel data includes known audience size totals, impression count totals, duration totals, and/or aggregate totals at different dimensions and/or demographics across multiple dimensions and/or demographics of audience members that accessed a media item under analysis. The census data may only include aggregate audience size totals, impression count totals, and/or duration totals across the multiple demographics and/or dimensions, but may not have individual totals per demographic and/or per dimension. Although the census data is incomplete, the census data represents the total aggregate audience size or a larger portion of the total aggregate audience size. Accordingly, it is beneficial to estimate the unknown census data based on the smaller known panel data to get a more accurate estimation of the breakdown of the individual audience sizes per demographic and per dimension for particular media items.

At block 304, the example data organization circuitry 202 (FIG. 2) organizes the panel data into matrices (e.g., where the rows correspond to dimensions and the column corresponds to demographics). For example, the data organization circuitry 202 organizes the panel audience size totals for each dimension and demographic in a first matrix ($A_{(j,k)}$), the panel impression count totals for each dimension and demographic in a second matrix ($R_{(j,k)}$), the panel duration totals for each dimension and demographic in a third matrix ($D_{(j,k)}$), the audience size totals for each dimension across all the demographics in a fourth matrix ($A_{(\cdot,-)}$), and the total universe for each demographic in a fifth matrix (U). An example of the organization of the panel data into the matrices is further shown below. At block 306, the example data organization circuitry 202 organizes the known census data into matrices. For example, the data organization circuitry 202 organizes the known census data into one or more matrices (e.g., $T_{(-,\cdot)}$, $V_{(-,\cdot)}$, $T_{(\cdot,\cdot)}$, $V_{(\cdot,\cdot)}$, etc.) depending on which census data is known.

At block 308, the example constraint set-up circuitry 204 (FIG. 2) sets up the census constraints(s) for census parameter(s) (e.g., $c_{(j)}^{\{T\}}$ and $c_{(j)}^{\{T\}}$ using $A_{(j,k)}$, $R_{(j,k)}$, and $\Delta R_{(j,k)}$ (e.g., where $\Delta R_j = D_j - R_j$) in the above Equations 21a-21b. At block 310, the example constraint set-up circuitry 204 sets up the census system of equations based on the known census data using the above Equations 22a-22b (e.g., the system being based on the known data from the census data). At block 312, the example non-linear equation calculation circuitry 206 (FIG. 2) selects value(s) for the census parameter(s) within the census constraint(s). For example, the example non-linear equation calculation circuitry 206 uses the selected value(s) to solve for the unknown census data and uses the results to see if they satisfy the Equations 22a and 22b. If the results do not satisfy Equations 22a and 22b the results are discarded and the example constraint set-up circuitry 204 selects different census parameter(s) and performs subsequent iteration(s) until the results satisfy Equations 22a and 22b.

At block 314, the example non-linear equation calculation circuitry 206 determines the impression frequencies and delta impression frequencies of the census audience size based on the census parameters. For example, the non-linear equation calculation circuitry 206 uses Equations 23c and 23d to determine the impression frequencies and the delta impression frequency(ies) of the census audience size based on the census parameters. Because Equations 23c and 23d utilize $\mathcal{D}_{(j,k)}^{\Delta T}$ and $\mathcal{D}_{(j,k)}^{T}$, the example non-linear equation calculation circuitry 206 may use Equations 23a and 23b to calculate $\mathcal{D}_{(j,k)}^{\Delta T}$ and $\mathcal{D}_{(j,k)}^{T}$ before and/or while calculating impression frequency and delta impression frequency of the census audience(s).

At block 316, the example non-linear equation calculation circuitry 206 determines duration frequencies of census audience size(s) based on the impression frequencies and delta impression frequencies using Equation 23e. For example, the non-linear equation calculation circuitry 206 determines the duration frequency of the census audience by summing the impression frequencies and delta impression frequencies of the census audience. At block 318, the example non-linear equation calculation circuitry 206 determines the odds or probabilities of people being in individual census audience(s) (e.g., corresponding to dimension and demographic) based on census parameters. For example, the non-linear equation calculation circuitry 206 determines the odds or probabilities of people being in individual census audience(s) using Equation 23f.

At block 320 of FIG. 3B, the example non-linear equation calculation circuitry 206 determines the odds or probabilities of a people being in the total census audience(s) based on the odds of the people being in the individual census audience(s). For example, the non-linear equation calculation circuitry 206 uses Equations 18b to determine the odds or probabilities of a person being in the total census audience(s). Because Equation 18b utilizes $P_k$, the example non-linear equation calculation circuitry 206 may use Equation 18b to calculate $P_k$ before and/or while calculating the odds or probability of a person being in the total census audience(s).

At block 322, the example non-linear equation calculation circuitry 206 determines the pseudo universe estimates(s) using Equation 19. A pseudo universe estimate corresponds to what the size of the universe of individuals capable of being in a given audience would need to be to achieve the audience size totals and reach values for that audience if the different demographics and/or dimensions are assumed to be independent, regardless of how much dependency actually exists among the different audience demographic and/or dimension totals. For example, when the universe of a panel audience is equal to the pseudo universe value, then the total reach of the panel audience can be calculated from the audience demographic and/or dimension totals assuming the audience demographic and/or dimensions totals are independent. At block 324, the example non-linear equation calculation circuitry 206 determines the census audience size totals based on the pseudo universe estimate(s). For example, the non-linear equation calculation circuitry 206 uses Equation 20a to determine the census audience size total(s) using the odds or probability of a person being in the total census audience(s) and the pseudo audience estimate(s).

At block 326, the example non-linear equation calculation circuitry 206 determines the census impression count totals based on the census audience size totals and the impression frequency using Equation 20b. At block 328, the example non-linear equation calculation circuitry 206 determines the census duration totals based on the census audience size totals and the duration frequency using Equation 20c. At block 330, the example non-linear equation calculation circuitry 206 applies the determined census impression count totals and census duration totals to the example census system of equations (e.g., Equations 22a and 22b).

At block 332, the example non-linear equation calculation circuitry 206 determines if the census impression count total(s) and the census duration total(s) satisfy the census system of equations. If the example non-linear equation calculation circuitry 206 determines that the census impression count total(s) and the census duration total(s) do not satisfy the census system of equations (block 332: NO), the example non-linear equation calculation circuitry 206 adjusts the selected value(s) for the census parameter(s) within the census constraint(s) (block 324) and control returns to block 314 for another iteration. If the example non-linear equation calculation circuitry 206 determines that the census impression count total(s) and the census duration total(s) satisfy the census system of equations (block 332: YES), the example non-linear equation calculation circuitry 206 solves for any remaining unknowns (block 336). For example, after all the census audience size totals, census impression count totals, and census duration totals are determined, the total census audience size, total census impression counts, and total census duration can be determined per demographic and/or across demographics. At block 338, the example report generation circuitry 208 (FIG. 2) generates a report identifying the determined audience size totals, impression count totals, and/or duration totals for each demographic and/or dimension and/or across multiple demographics and/or multiple dimensions for the census data by summing the audience size totals, impression count totals, and/or duration totals across the demographics and/or the dimensions. The report may be a report that is output via a user interface and/or a data that can be sent to an end user. After block 338, control ends. An example of the process of FIG. 3 is described below.

The following is a first example illustrating panel data across two dimensions and two demographics and census data where the total number of census impressions and the total census duration of impressions across demographics for each dimension is known, as shown below in example Tables 5-7. In the below example Tables 5-16, the label "Audience" represents audience size and the label "Impressions" represents impression count.

TABLE 5

Demographic index 1, population = 1,000

| | Panel | | | Census | | |
|---|---|---|---|---|---|---|
| Dim. | Audience | Impressions | Duration | Audience | Impressions | Duration |
| 1 | 100 | 300 | 400 | $X_{(1, 1)}$ | $T_{(1, 1)}$ | $V_{(1, 1)}$ |
| 2 | 200 | 500 | 600 | $X_{(2, 1)}$ | $T_{(2, 1)}$ | $V_{(2, 1)}$ |
| Total | | 250 | | | $X_{(\cdot, 1)}$ | |

TABLE 6

Demographic index 2, population = 2,000

| | Panel | | | Census | | |
|---|---|---|---|---|---|---|
| Dim. | Audience | Impressions | Duration | Audience | Impressions | Duration |
| 1 | 150 | 400 | 800 | $X_{(1, 2)}$ | $T_{(1, 2)}$ | $V_{(1, 2)}$ |
| 2 | 250 | 300 | 400 | $X_{(2, 2)}$ | $T_{(2, 2)}$ | $V_{(2, 2)}$ |
| Total | | 300 | | | $X_{(\cdot, 2)}$ | |

TABLE 7

Totals Across Demographics

| | Panel | | | Census | | |
|---|---|---|---|---|---|---|
| Dim. | Audience | Impressions | Duration | Audience | Impressions | Duration |
| 1 | 250 | 700 | 1,200 | $X_{(1, \cdot)}$ | 1,000 | 1,500 |
| 2 | 450 | 800 | 1,000 | $X_{(2, \cdot)}$ | 1,200 | 1,300 |
| Total | | 550 | | | $X_{(\cdot, \cdot)}$ | |

Using the data from the example of Tables 5-7, the example data organization circuitry 202 (FIG. 2) organizes the panel data and the known census data into matrices as shown in the below example Equations 24a-g.

$$A = \begin{bmatrix} 100 & 150 \\ 200 & 250 \end{bmatrix} \quad \text{(Equation 24a)}$$

$$R = \begin{bmatrix} 300 & 400 \\ 500 & 300 \end{bmatrix} \quad \text{(Equation 24b)}$$

$$D = \begin{bmatrix} 400 & 800 \\ 600 & 400 \end{bmatrix} \quad \text{(Equation 24c)}$$

$$A_{(\bullet, -)} = [250 \; 300] \quad \text{(Equation 24d)}$$

$$U = [1000 \; 2000] \quad \text{(Equation 24e)}$$

$$T_{(-, \bullet)} = \begin{bmatrix} 1000 \\ 1200 \end{bmatrix} \quad \text{(Equation 24f)}$$

$$V_{(-, \bullet)} = \begin{bmatrix} 1500 \\ 1300 \end{bmatrix} \quad \text{(Equation 24g)}$$

The example constraints set-up circuitry 204 (FIG. 2) sets up the constraints on the four unknowns needed to determine the unknown census data, as shown below in example Equations 25a and 25b.

$$\begin{bmatrix} 0 \\ 0 \end{bmatrix} \leq \begin{bmatrix} c_{(1)}^{\{T\}} \\ c_{(2)}^{\{T\}} \end{bmatrix} \leq \begin{bmatrix} 1.5 \\ 1.66 \end{bmatrix} \quad \text{(Equation 25a)}$$

$$\begin{bmatrix} 0 \\ 0 \end{bmatrix} \leq \begin{bmatrix} c_{(1)}^{\{\Delta T\}} \\ c_{(2)}^{\{\Delta T\}} \end{bmatrix} \leq \begin{bmatrix} 1.375 \\ 3.0 \end{bmatrix} \quad \text{(Equation 25b)}$$

Additionally, the example constraints set-up circuitry 204 sets up the census system of equations as shown below in example Equations 26a-d $$T_{(1,1)} + T_{(1,2)} = 1000 \quad \text{(Equations 26a)}$$

$$T_{(2,1)} + T_{(2,2)} = 1200 \quad \text{(Equations 26b)}$$

$$V_{(1,1)} + V_{(1,2)} = 1500 \quad \text{(Equations 26c)}$$

$$V_{(2,1)} + V_{(2,2)} = 1300 \quad \text{(Equations 26d)}$$

As described above, after the census constraints and the census system of equations are defined, the example non-linear equation calculation circuitry 206 (FIG. 2) performs the iterative process of selecting the values for the census variables and applying the Equations example 18a-c, 19, 20a-c, and 23a-f, until solutions for the impression counts and durations are found that satisfy Equations 26a-d. The below example Equations 27a-o illustrate the final calculations for the final iteration that result in satisfaction of example Equation 26a-d.

$$c^{[T]} = \begin{bmatrix} 1.0846 \\ 1.1796 \end{bmatrix} \quad \text{(Equation 27a)}$$

$$c^{[\Delta T]} = \begin{bmatrix} 0.95216 \\ 0.521608 \end{bmatrix} \quad \text{(Equation 27b)}$$

$$\mathcal{D}^T = \begin{bmatrix} 83.080 & 128.85 \\ 146.118 & 241.02 \end{bmatrix} \quad \text{(Equation 27c)}$$

$$\mathcal{D}^{\Delta T} = \begin{bmatrix} 104.784 & 169.136 \\ 247.839 & 297.839 \end{bmatrix} \quad \text{(Equation 27d)}$$

$$f^T = \begin{bmatrix} 3.61098 & 3.10439 \\ 3.42189 & 1.24471 \end{bmatrix} \quad \text{(Equation 27e)}$$

$$f^{\Delta T} = \begin{bmatrix} 0.908687 & 2.251820 \\ 0.210462 & 0.175131 \end{bmatrix} \quad \text{(Equation 27f)}$$

$$f^V = \begin{bmatrix} 4.51967 & 5.3562 \\ 3.63236 & 1.41984 \end{bmatrix} \quad \text{(Equation 27g)}$$

$$o = \begin{bmatrix} 2.407930 & 1.339550 \\ 0.767486 & 0.486841 \end{bmatrix} \quad \text{(Equation 27h)}$$

$$P = [0.306811 \ 0.18747827] \quad \text{(Equation 27i)}$$

$$o_{(\bullet,-)} = [2.21304 \ 5.23] \quad \text{(Equation 27j)}$$

$$X_{(\bullet,-)} = [311.232 \ 321.027] \quad \text{(Equation 27k)}$$

$$Q^X = [448.986 \ 395.009] \quad \text{(Equation 27l)}$$

$$X = \begin{bmatrix} 131.747 & 168.878 \\ 254.024 & 265.731 \end{bmatrix} \quad \text{(Equation 27m)}$$

$$T = \begin{bmatrix} 475.737 & 524.263 \\ 869.242 & 330.758 \end{bmatrix} \quad \text{(Equation 27n)}$$

$$V = \begin{bmatrix} 595.454 & 904.546 \\ 922.704 & 377.296 \end{bmatrix} \quad \text{(Equation 27o)}$$

Tables 8-10 illustrate an example report that the example report generation circuitry 208 (FIG. 2) may output to illustrate the results.

TABLE 8

Demographic index 1, population = 1,000

| | Panel | | | Census | | |
|---|---|---|---|---|---|---|
| Dim. | Audience | Impressions | Duration | Audience | Impressions | Duration |
| 1 | 100 | 300 | 400 | 132 | 476 | 595 |
| 2 | 200 | 500 | 600 | 254 | 869 | 923 |
| Total | | 250 | | | 311 | |

TABLE 9

Demographic index 2, population = 2,000

| | Panel | | | Census | | |
|---|---|---|---|---|---|---|
| Dim. | Audience | Impressions | Duration | Audience | Impressions | Duration |
| 1 | 150 | 400 | 800 | 169 | 524 | 905 |
| 2 | 250 | 300 | 400 | 266 | 331 | 377 |
| Total | | 300 | | | 321 | |

TABLE 10

Totals Across Demographics

| | Panel | | | Census | | |
|---|---|---|---|---|---|---|
| Dim. | Audience | Impressions | Duration | Audience | Impressions | Duration |
| 1 | 250 | 700 | 1,200 | 301 | 1,000 | 1,500 |
| 2 | 450 | 800 | 1,000 | 520 | 1,200 | 1,300 |
| Total | | 550 | | | 632 | |

The following is a second example illustrating panel data across two dimensions and two demographics and census data where the total number of census impressions and the total census duration of impressions across dimensions and demographics is known, as shown below in example Tables 11-13.

TABLE 11

Demographic index 1, population = 1,000

| | Panel | | | Census | | |
|---|---|---|---|---|---|---|
| Dim. | Audience | Impressions | Duration | Audience | Impressions | Duration |
| 1 | 100 | 300 | 400 | $X_{(1,1)}$ | $T_{(1,1)}$ | $V_{(1,1)}$ |
| 2 | 200 | 500 | 600 | $X_{(2,1)}$ | $T_{(2,1)}$ | $V_{(2,1)}$ |
| Total | | 250 | | $X_{(\cdot,1)}$ | | |

TABLE 12

Demographic index 2, population = 2,000

| | Panel | | | Census | | |
|---|---|---|---|---|---|---|
| Dim. | Audience | Impressions | Duration | Audience | Impressions | Duration |
| 1 | 150 | 400 | 800 | $X_{(1,2)}$ | $T_{(1,2)}$ | $V_{(1,2)}$ |
| 2 | 250 | 300 | 400 | $X_{(2,2)}$ | $T_{(2,2)}$ | $V_{(2,2)}$ |
| Total | | 300 | | $X_{(\cdot,2)}$ | | |

TABLE 13

Totals Across Demographics

| | Panel | | | Census | | |
|---|---|---|---|---|---|---|
| Dim. | Audience | Impressions | Duration | Audience | Impressions | Duration |
| 1 | 250 | 700 | 1,200 | $X_{(1,\cdot)}$ | $T_{(1,\cdot)}$ | $V_{(1,\cdot)}$ |
| 2 | 450 | 800 | 1,000 | $X_{(2,\cdot)}$ | $T_{(2,\cdot)}$ | $V_{(2,\cdot)}$ |
| Total | | 550 | | $X_{(\cdot,\cdot)}$ | 2,200 | 2,800 |

Using the data from the example of Tables 5-7, the example data organization circuitry 202 organizes the panel data and the known census data into matrices as shown in the below example Equations 28a-g.

$$A = \begin{bmatrix} 100 & 150 \\ 200 & 250 \end{bmatrix} \quad \text{(Equation 28a)}$$

$$R = \begin{bmatrix} 300 & 400 \\ 500 & 300 \end{bmatrix} \quad \text{(Equation 28b)}$$

$$D = \begin{bmatrix} 400 & 800 \\ 600 & 400 \end{bmatrix} \quad \text{(Equation 28c)}$$

$$A_{(\bullet,-)} = [250 \ 300] \quad \text{(Equation 28d)}$$

$$U = [1000 \ 2000] \quad \text{(Equation 28e)}$$

$$T_{(\bullet,\bullet)} = [2200] \quad \text{(Equation 28f)}$$

$$V_{(\bullet,\bullet)} = [2800] \quad \text{(Equation 28g)}$$

The example constraints set-up circuitry 204 sets up the constraints on the four unknowns needed to determine the unknown census data, as shown below in example Equations 29a and 29b.

$$[0] \leq [c^{\{T\}}] \leq [1.5] \quad \text{(Equation 29a)}$$

$$[0] \leq [c^{\{T\}}] \leq [1.375] \quad \text{(Equation 29b)}$$

Additionally, the example constraints set-up circuitry 204 sets up the census system of equations as shown below in example Equations 30a-d $$T_{(1,1)} + T_{(1,2)} + T_{(2,1)} + T_{(2,2)} = 2200 \quad \text{(Equations 30a)}$$

$$V_{(1,1)} + V_{(1,2)} + V_{(2,1)} + V_{(2,2)} = 2800 \quad \text{(Equations 30b)}$$

As described above, after the census constraints and the census system of equations are defined, the example non-linear equation calculation circuitry 206 performs the iterative process of selecting the values for the census variables and applying the example Equations 18a-c, 19, 20a-c, and 23a-f, until solutions for the impression counts and durations are found that satisfy example Equations 30a-d. The below example Equations 31a-o illustrate the final calculations for the final iteration that result in satisfaction of example Equation 30a-d.

$$c^{\{T\}} = [1.07497] \quad \text{(Equation 31a)}$$

$$c^{\{\Delta T\}} = [0.01634] \quad \text{(Equation 31b)}$$

$$\mathcal{D}^T = \begin{bmatrix} 76.2252 & 120.281 \\ 164.338 & 224.056 \end{bmatrix} \quad \text{(Equation 31c)}$$

$$\mathcal{D}^{\Delta T} = \begin{bmatrix} 112 & 198 \\ 212 & 262 \end{bmatrix} \quad \text{(Equation 31d)}$$

$$f^T = \begin{bmatrix} 3.93571 & 3.32553 \\ 3.04251 & 1.22922 \end{bmatrix} \quad \text{(Equation 31e)}$$

$$f^{\Delta T} = \begin{bmatrix} 0.785715 & 1.77778 \\ 0.415095 & 0.335878 \end{bmatrix} \quad \text{(Equation 31f)}$$

$$f^V = \begin{bmatrix} 4.72142 & 5.10331 \\ 3.45761 & 1.5651 \end{bmatrix} \quad \text{(Equation 31g)}$$

$$o = \begin{bmatrix} 2.28906 & 1.41903 \\ 0.778452 & 0.457193 \end{bmatrix} \quad \text{(Equation 31h)}$$

$$P = [0.304632 \ 0.184049] \quad \text{(Equation 31i)}$$

$$o_{(\bullet,-)} = [2.19043 \ 5.11277] \quad \text{(Equation 31j)}$$

$$X_{(\bullet,-)} = [313.437 \ 327.184] \quad \text{(Equation 31k)}$$

$$Q^X = [450.75 \ 400.985] \quad \text{(Equation 31l)}$$

$$X = \begin{bmatrix} 137.045 & 165.763 \\ 253.451 & 275.176 \end{bmatrix} \quad \text{(Equation 31m)}$$

$$T = \begin{bmatrix} 539.37 & 551.249 \\ 771.127 & 338.253 \end{bmatrix} \quad \text{(Equation 31n)}$$

$$V = \begin{bmatrix} 647.049 & 845.939 \\ 876.333 & 430.679 \end{bmatrix} \quad \text{(Equation 31o)}$$

Tables 14-16 illustrate an example report that the example report generation circuitry 208 may output to illustrate the results.

TABLE 14

Demographic index 1, population = 1,000

| | Panel | | | Census | | |
|---|---|---|---|---|---|---|
| Dim. | Audience | Impressions | Duration | Audience | Impressions | Duration |
| 1 | 100 | 300 | 400 | 137 | 539 | 647 |
| 2 | 200 | 500 | 600 | 253 | 771 | 876 |
| Total | | 250 | | | 313 | |

TABLE 15

Demographic index 2, population = 2,000

| | Panel | | | Census | | |
|---|---|---|---|---|---|---|
| Dim. | Audience | Impressions | Duration | Audience | Impressions | Duration |
| 1 | 150 | 400 | 800 | 166 | 551 | 846 |
| 2 | 250 | 300 | 400 | 275 | 338 | 431 |
| Total | | 300 | | | 327 | |

TABLE 16

Totals Across Demographics

| | Panel | | | Census | | |
|---|---|---|---|---|---|---|
| Dim. | Audience | Impressions | Duration | Audience | Impressions | Duration |
| 1 | 250 | 700 | 1,200 | 303 | 1,091 | 1,493 |
| 2 | 450 | 800 | 1,000 | 529 | 1,109 | 1,307 |
| Total | | 550 | | | 641 | 2,200 | 2,800 |

Figure 4:
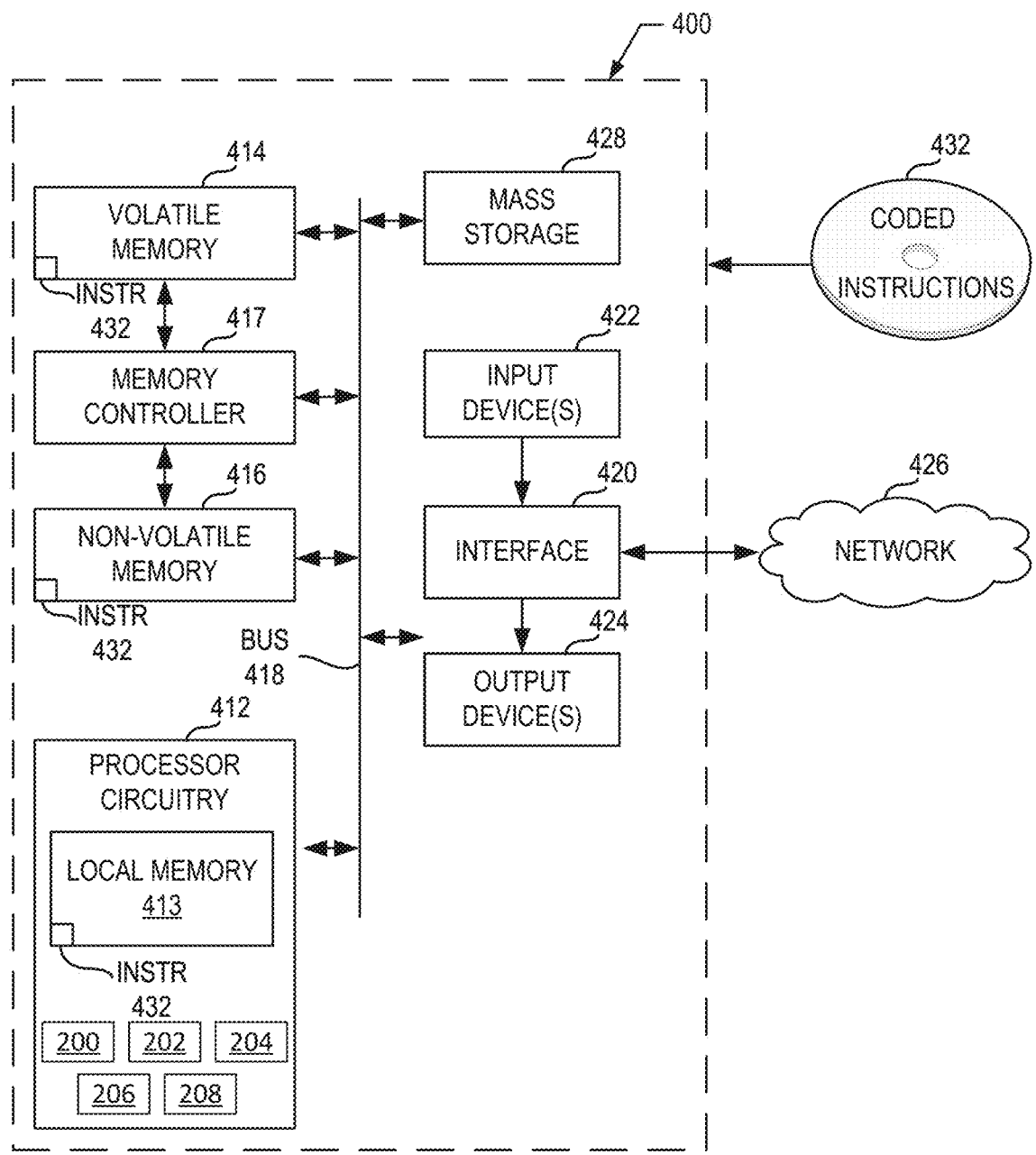
FIG. 4 is a block diagram of an example processor platform that may be utilized to execute the example instructions of FIGS. 4-7 to implement the example audience metrics generator circuitry of FIG. 2 and/or FIG. 3.

FIG. 4 is a block diagram of an example processor platform 400 structured to execute and/or instantiate the machine readable instructions and/or operations of FIGS. 3A and 3B to implement the audience metrics generator circuitry 114 of FIG. 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs microprocessors, CPUs, GPUs, DSPs, and/or microcontrollers from any desired family or manufacturer. The processor circuitry 412 may be implemented by one or more semiconductor based (e.g., silicon based) devices. In this example, the processor circuitry 412 implements the example data interface 200, the example data organization circuitry 202, the example constraint set-up circuitry 204, the example non-linear equation calculation circuitry 206, the example report generation circuitry 208.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. Any one of the example memories 413, 414, 416 may implement the census database 210 and/or the panel database 212.

The processor platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 424 are also connected to the interface circuitry 420 of the illustrated example. The output devices 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 400 of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 432, which may be implemented by the machine readable instructions of FIGS. 3A and 3B may be stored in the mass storage device 428, in the volatile memory 414, in the non-volatile memory 416, and/or on a removable non-transitory computer readable storage medium such as a CD or DVD.

Figure 5:
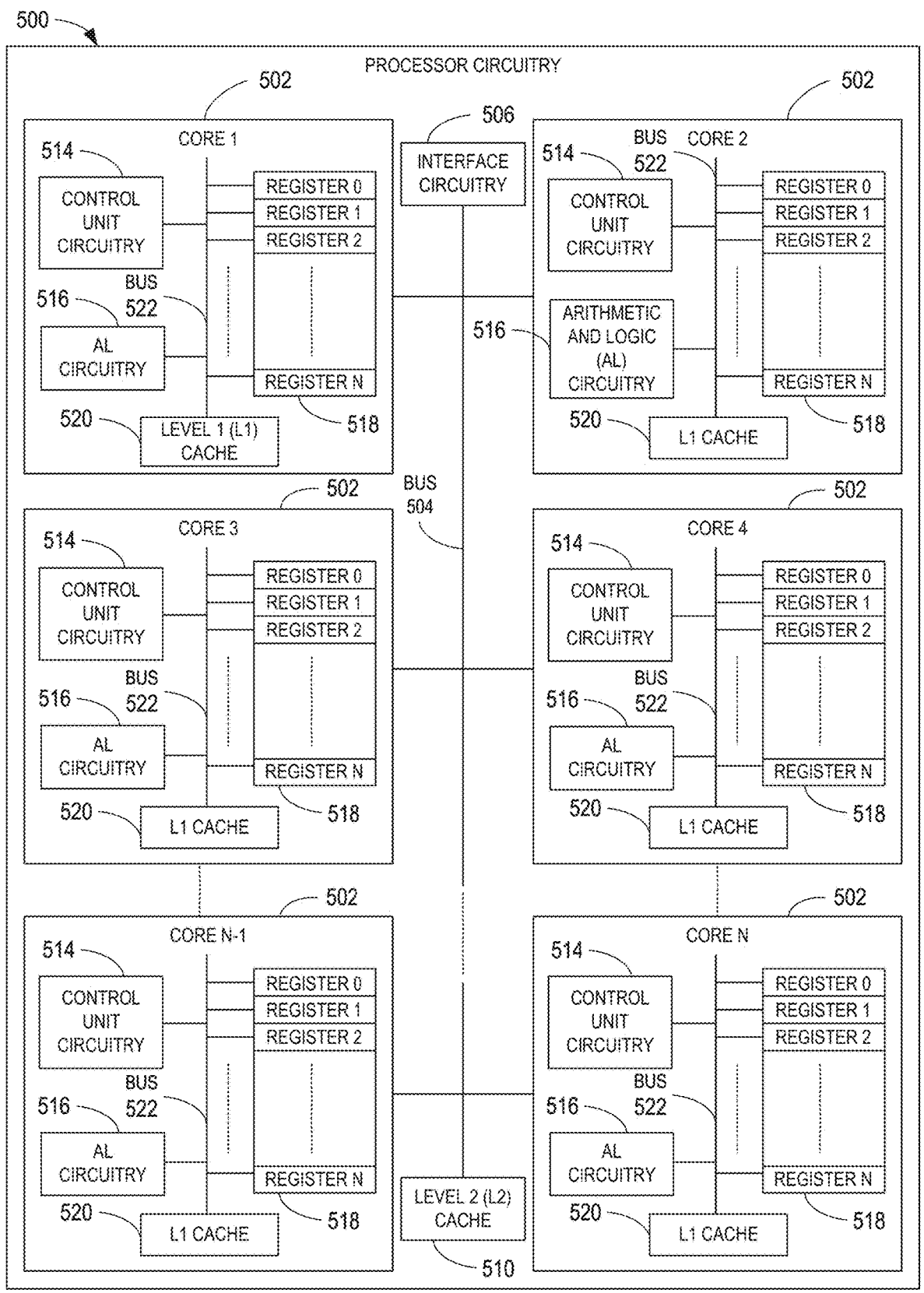
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a microprocessor 500. For example, the microprocessor 500 may implement multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIGS. 3A and 3B.

The cores 502 may communicate by an example bus 504. In some examples, the bus 504 may implement a communication bus to effectuate communication associated with one(s) of the cores 502. For example, the bus 504 may implement at least one of an Inter-Integrated Circuit (I2C) bus, a Serial Peripheral Interface (SPI) bus, a PCI bus, or a PCIe bus. Additionally or alternatively, the bus 504 may implement any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2_cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the L1 cache 520, and an example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s), SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The bus 520 may implement at least one of an I2C bus, a SPI bus, a PCI bus, or a PCIe bus Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
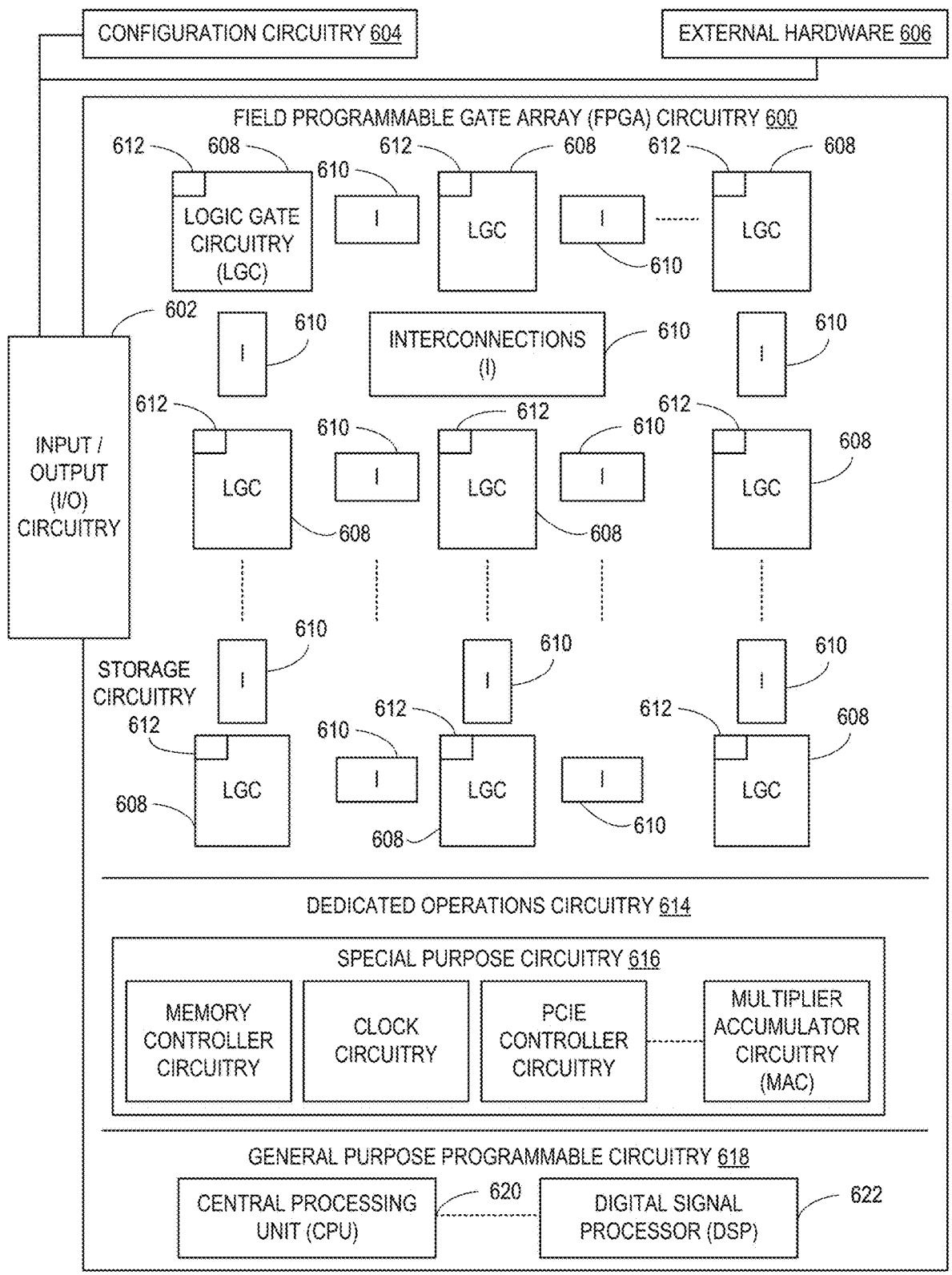
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIGS. 3A and 3B but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowchart of FIGS. 3A and 3B. In particular, the FPGA 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowchart of FIGS. 3A and 3B. As such, the FPGA circuitry 600 may be structured to effectively instantiate some or all of the machine readable instructions of the flowchart of FIGS. 3A and 3B as dedicated logic circuits to perform the operations corresponding to those software instructions in a dedicated manner analogous to an ASIC. Therefore, the FPGA circuitry 600 may perform the operations corresponding to the some or all of the machine readable instructions of FIGS. 3A and 3B faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware (e.g., external hardware circuitry) 606. For example, the configuration circuitry 604 may implement interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 606 may implement the microprocessor 500 of FIG. 5. The FPGA circuitry 600 also includes an array of example logic gate circuitry 608, a plurality of example configurable interconnections 610, and example storage circuitry 612. The logic gate circuitry 608 and interconnections 610 are configurable to instantiate one or more operations that may correspond to at least some of the machine readable instructions of FIGS. 3A and 3B and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The interconnections 610 of the illustrated example are conductive pathways, traces, vias, or the like that may include electrically controllable switches (e.g., transistors)

whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowchart of FIGS. 3A and 3B may be executed by one or more of the cores 502 of FIG. 5 and a second portion of the machine readable instructions represented by the flowchart of FIGS. 3A and 3B may be executed by the FPGA circuitry 600 of FIG. 6.

In some examples, the processor circuitry 412 of FIG. 4 may be in one or more packages. For example, the processor circuitry 500 of FIG. 5 and/or the FPGA circuitry 500 of FIG. 5 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

Figure 7:
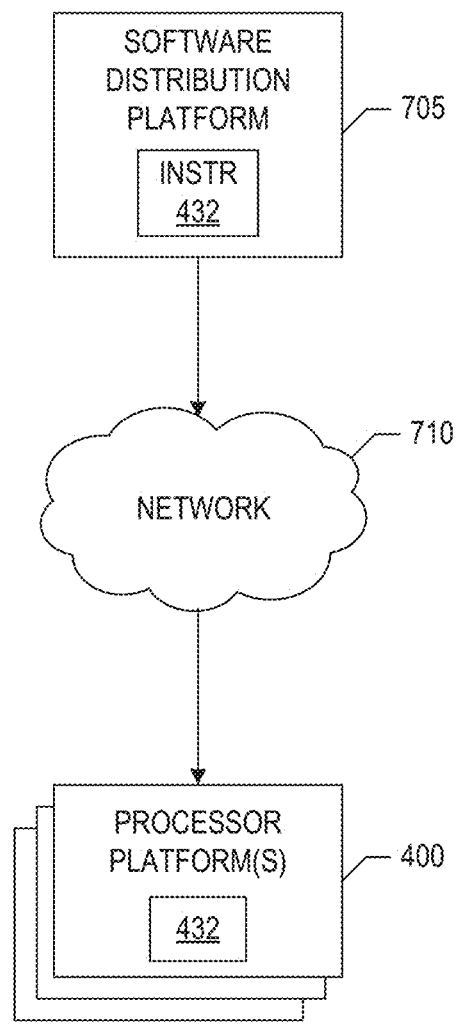
FIG. 7 is a block diagram of an example software distribution platform (e.g., one or more servers) to distribute software (e.g., software corresponding to the example machine readable instructions of FIGS. 3A and 3B to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to hardware devices owned and/or operated by third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 7705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions 300 of FIGS. 3A and 3B, as described above. The one or more servers of the example software distribution platform 705 are in communication with a network 710, which may correspond to any one or more of the Internet and/or any of the example networks 104 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions 300 of FIGS. 3A and 3B, may be downloaded to the example processor platform 400, which is to execute the machine readable instructions 432 to implement the audience metrics generator circuitry 114. In some example, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices.

Example methods, apparatus, systems, and articles of manufacture to estimate census level audience sizes, impression counts, and duration data are disclosed herein. Further examples and combinations thereof include the following:

Example 1 includes a non-transitory computer readable storage medium comprising instructions which, when executed, cause one or more processors to at least set up a system of equations based on first census data, select a census parameter value based on a constraint for census parameter selection, the constraint based on media access represented in panel data, iteratively solve for second census data that satisfies the system of equations using the panel data and the census parameter value, the second census data including an audience size value, an impression count value, and a duration value for a media item accessed by anonymous audience members in a demographic group, and generate a report including the second census data.

Example 2 includes the non-transitory computer readable storage medium of example 1, wherein the panel data includes at least one of a total panel audience size of the media item for a single demographic and a single dimension, a total number of panel demographic impressions of the media item for the single demographic and the single dimension, and a total panel impression duration of the media item for the single demographic and the single dimension.

Example 3 includes the non-transitory computer readable storage medium of example 1, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

Example 4 includes the non-transitory computer readable storage medium of example 1, wherein the instructions cause the one or more processors to set up the constraint based on panel demographic impression count totals from the panel data and panel audience size totals from the panel data.

Example 5 includes the non-transitory computer readable storage medium of example 1, wherein the instructions cause the one or more processors to iteratively solve for the second census data by, for a first iteration selecting a first value for the census parameter value within the constraint, determine an impression frequency of the second census data and a delta impression frequency of the second census data based on the first value, determining a duration frequency for the second census data, determine a first probability of a person being in the demographic group based on the first value, determine a second probability of the person being in a total census audience based on the first probability, determine a pseudo universe estimate based on the first probability, the second probability, and a universe estimate, determine census audience size totals based on the pseudo universe estimate, determine census impression count totals based on the census audience size totals and the impression frequency, and determine census duration totals based on the census audience size totals and the duration frequency.

Example 6 includes the non-transitory computer readable storage medium of example 5, wherein the instructions cause the one or more processors to determine if the census impression count totals and the census duration totals satisfy the system of equations, when the census impression count totals and the census duration totals do not satisfy the system of equations, perform a second iteration with a second census parameter value within the constraint, and when the census impression count totals and the census duration totals satisfy the system of equations, output the census audience size totals, the census impression count totals, and the census duration totals.

Example 7 includes the non-transitory computer readable medium of example 1, wherein the system of equations corresponds to at least one of (a) a first sum of demographic impressions across demographics or (b) a second sum of durations across the demographics.

Example 8 includes the non-transitory computer readable medium of example 1, wherein to instructions cause the one or more processors to access records of impressions from a memory store, the records of impressions logged by a server based on network communications received at the server from first client devices that accessed the media item, the second census data to overcome a technical inability of the server to recognize second client devices that accessed the media item.

Example 9 includes an apparatus comprising memory, instructions in the apparatus, and processor circuitry to execute the instructions to set up a system of equations based on first census data, select a census parameter value based on a constraint for census parameter selection, the constraint based on media access represented in panel data, iteratively solve for second census data that satisfies the system of equations using the panel data and the census parameter value, the second census data including an audience size value, an impression count value, and a duration value for a media item accessed by anonymous audience members in a demographic group, and generate a report including the second census data.

Example 10 includes the apparatus of example 9, wherein the panel data includes at least one of a total panel audience size of the media item for a single demographic and a single dimension, a total number of panel demographic impressions of the media item for the single demographic and the single dimension, and a total panel impression duration of the media item for the single demographic and the single dimension.

Example 11 includes the apparatus of example 9, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

Example 12 includes the apparatus of example 9, wherein the processor circuitry is to set up the constraint based on panel demographic impression count totals from the panel data and panel audience size totals from the panel data.

Example 13 includes the apparatus of example 9, wherein the processor circuitry is to iteratively solve for the second census data by, for a first iteration selecting a first value for the census parameter value within the constraint, determine an impression frequency of the second census data and a delta impression frequency of the second census data based on the first value, determining a duration frequency for the second census data, determine a first probability of a person being in the demographic group based on the first value, determine a second probability of the person being in a total census audience based on the first probability, determine a pseudo universe estimate based on the first probability, the second probability, and a universe estimate, determine census audience size totals based on the pseudo universe estimate, determine census impression count totals based on the census audience size totals and the impression frequency, and determine census duration totals based on the census audience size totals and the duration frequency.

Example 14 includes the apparatus of example 13, wherein the processor circuitry is to determine if the census impression count totals and the census duration totals satisfy the system of equations, when the census impression count totals and the census duration totals do not satisfy the system of equations, perform a second iteration with a second census parameter value within the constraint, and when the census impression count totals and the census duration totals satisfy the system of equations, output the census audience size totals, the census impression count totals, and the census duration totals.

Example 15 includes the apparatus of example 9, wherein the system of equations corresponds to at least one of (a) a first sum of demographic impressions across demographics or (b) a second sum of durations across the demographics.

Example 16 includes the apparatus of example 9, wherein the processor circuitry is to access records of impressions from a memory store, the records of impressions logged by a server based on network communications received at the server from first client devices that accessed the media item, the second census data to overcome a technical inability of the server to recognize second client devices that accessed the media item.

Example 17 includes an apparatus comprising constraint set-up circuitry to set up a system of equations based on first census data, and select a census parameter value based on a constraint for census parameter selection, the constraint based on media access represented in panel data, non-linear equation calculation to iteratively solve for second census data that satisfies the system of equations using the panel data and the census parameter value, the second census data including an audience size value, an impression count value, and a duration value for a media item accessed by anonymous audience members in a demographic group, and report generation circuitry to generate a report including the second census data.

Example 18 includes the apparatus of example 17, wherein the panel data includes at least one of a total panel audience size of the media item for a single demographic and a single dimension, a total number of panel demographic impressions of the media item for the single demographic and the single dimension, and a total panel impression duration of the media item for the single demographic and the single dimension.

Example 19 includes the apparatus of example 17, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

Example 20 includes the apparatus of example 17, wherein the constraint set-up circuitry is to set up the constraint based on panel demographic impression count totals from the panel data and panel audience size totals from the panel data.

Example 21 includes the apparatus of example 17, wherein the non-linear equation calculation is to iteratively solve for the second census data by, for a first iteration selecting a first value for the census parameter value within the constraint, determine an impression frequency of the second census data and a delta impression frequency of the second census data based on the first value, determining a duration frequency for the second census data, determine a first probability of a person being in the demographic group based on the first value, determine a second probability of the person being in a total census audience based on the first probability, determine a pseudo universe estimate based on the first probability, the second probability, and a universe estimate, determine census audience size totals based on the pseudo universe estimate, determine census impression count totals based on the census audience size totals and the impression frequency, and determine census duration totals based on the census audience size totals and the duration frequency.

Example 22 includes the apparatus of example 21, wherein the non-linear equation calculation is to determine if the census impression count totals and the census duration totals satisfy the system of equations, when the census impression count totals and the census duration totals do not satisfy the system of equations, perform a second iteration with a second census parameter value within the constraint, and when the census impression count totals and the census duration totals satisfy the system of equations, output the census audience size totals, the census impression count totals, and the census duration totals.

Example 23 includes the apparatus of example 17, wherein the system of equations corresponds to at least one of (a) a first sum of demographic impressions across demographics or (b) a second sum of durations across the demographics.

Example 24 includes the apparatus of example 17, further including an interface to access records of impressions from a memory store, the records of impressions logged by a server based on network communications received at the server from first client devices that accessed the media item, the second census data to overcome a technical inability of the server to recognize second client devices that accessed the media item.

From the foregoing, it will be appreciated that the above disclosed examples may be used to estimate census level audience sizes, impression counts, and/or duration data. Traditional techniques solve for unknown census data can be determined using the above system of Equations 9a-d with Equation 10. However, solving doing so requires a large amount of processor resources and/or memory. Also, the system of Equations corresponding to Equations 9a-d and 10 do not account for particular constraints. Accordingly, such traditional techniques may result in errors and/or result in audience size estimations that are mathematically correct, but realistically incorrect (e.g., impression counts less than the number of people represented by an audience size, negative values, errors, etc.). Accordingly, examples disclosed herein perform an analytical iteration-based approach (e.g., using one or more of Equations 11a-23f to solve for unknown values that results in mathematically and/or realistically correct solutions that require less memory and processor resources than traditional techniques. Accordingly, the disclosed systems, methods, apparatus, and articles of manufacture are accordingly directed to one or more improvement(s) in the operation of a machine such as a computer or other electronic and/or mechanical device.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions which, when executed, cause one or more processors of an audience measurement entity computing system to at least:

tag media items with monitoring instructions to cause client devices to transmit, over a network, to the audience measurement entity computing system, beacon requests when the tagged media items are accessed by the client devices, the beacon requests comprising media identifiers of the tagged media items;

receive the beacon requests via network circuitry of the audience measurement entity computing system, from monitoring devices, and over the network, the monitoring devices configured to monitor the tagged media items accessed by the client devices;

based on the receipt of the beacon requests, determine panel data by logging a record of demographic impressions of the tagged media items, wherein the logging comprises recording the media identifiers in association with panelist demographic information for audience members who were exposed to the tagged media items via the client devices, wherein the panelist demographic information is stored by the audience measurement entity computing system;

return beacon response messages via the network circuitry to the client devices, wherein the beacon response messages comprise redirect messages that instruct the client devices to send second beacon requests to a database proprietor server;

obtain, via the network circuitry, from the database proprietor server, database proprietor demographic impressions recorded by the database proprietor server in association with corresponding demographic information provided by the database proprietor server in response to the second beacon requests from registered subscribers of the database proprietor server;
access first census data from a server;
set up a system of equations corresponding to constraints based on the first census data;
select a census parameter value based on a first constraint of the constraints, the first constraint selected for census parameter selection, the first constraint based on media accesses represented in the panel data;
iteratively solve for a duration value for a tagged media item that satisfies the system of equations using the panel data and the census parameter value to improve the functionality of the audience measurement entity computing system by reducing memory and processor resources utilized by the audience measurement entity computing system for determining the duration value for the tagged media item, the duration value corresponding to a duration that the tagged media item was accessed by anonymous audience members in a demographic group, the iteratively solving for the duration value including:
determining an impression frequency of second census data based on the census parameter value;
determining a duration frequency for the second census data;
determining a first probability of a person being in the demographic group based on the census parameter value;
determining a second probability of the person being in a total census audience based on the first probability;
determining a pseudo universe estimate based on the first probability, the second probability, and a universe estimate;
determining census audience size totals based on the pseudo universe estimate;
determining census impression count totals based on the impression frequency and the census audience size totals;
determining census duration totals based on the census audience size totals and the impression frequency; and
performing a subsequent iteration when the census duration totals and the census impression count totals do not satisfy the system of equations;
generate a report including the duration value for the tagged media item; and
transmit the report to an end-user computing device,
wherein the one or more processors comprise one or more Application Specific Integrated Circuits (ASICs).

2. The non-transitory computer readable storage medium of claim 1, wherein the panel data includes at least one of a total panel audience size of the tagged media item for a single demographic and a single dimension, a total number of the logged demographic impressions of the tagged media item for the single demographic and the single dimension, and a total panel impression duration of the tagged media item for the single demographic and the single dimension.

3. The non-transitory computer readable storage medium of claim 1, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

4. The non-transitory computer readable storage medium of claim 1, wherein the instructions cause the one or more processors to set up the first constraint based on panel demographic impression count totals from the panel data and panel audience size totals from the panel data.

5. The non-transitory computer readable storage medium of claim 1, wherein the instructions cause the one or more processors to:
determine if the census impression count totals and the census duration totals satisfy the system of equations;
when the census impression count totals and the census duration totals do not satisfy the system of equations, perform a second iteration with a second census parameter value within the first constraint; and
when the census impression count totals and the census duration totals satisfy the system of equations, output the census audience size totals, the census impression count totals, and the census duration totals.

6. The non-transitory computer readable storage medium of claim 1, wherein the system of equations corresponds to at least one of (a) a first sum of demographic impressions across demographics or (b) a second sum of durations across the demographics.

7. An audience measurement entity computing system comprising:
network circuitry;
memory storing instructions;
one or more processors to execute the instructions to:
tag media items with monitoring instructions to cause client devices to transmit, over a network, to the audience measurement entity computing system, beacon requests when the tagged media items are accessed by the client devices, the beacon requests comprising media identifiers of the tagged media items;
receive the beacon requests via network circuitry of the audience measurement entity computing system, from monitoring devices, and over the network, the monitoring devices configured to monitor the tagged media items accessed by the client devices;
based on the receipt of the beacon requests, determine panel data by logging a record of demographic impressions of the tagged media items, wherein the logging comprises recording the media identifiers in association with panelist demographic information for audience members who were exposed to the tagged media items via the client devices, wherein the panelist demographic information is stored by the audience measurement entity computing system;
return beacon response messages via the network circuitry to the client devices, wherein the beacon response messages comprise redirect messages that instruct the client devices to send second beacon requests to a database proprietor server;
obtain, via the network circuitry, from the database proprietor server, database proprietor demographic impressions recorded by the database proprietor server in association with corresponding demographic information provided by the database proprietor server in response to the second beacon requests from registered subscribers of the database proprietor server;
access first census data from a server;
set up a system of equations corresponding to constraints based on the census data;
select a census parameter value based on a first constraint of the constraints, the first constraint selected for census parameter selection, the first constraint based on media assesses represented in the panel data;

iteratively solve for a duration value for a tagged media item that satisfies the system of equations using the panel data and the census parameter value to improve the functionality of the audience measurement entity computing system by reducing memory and processor resources utilized by the audience measurement entity computing system for determining the duration value for the tagged media item, the duration value corresponding to a duration that the tagged media item was accessed by anonymous audience members in a demographic group, the iteratively solving for the duration value including:

determining an impression frequency of second census data based on the census parameter value;

determining a duration frequency for the second census data;

determining a first probability of a person being in the demographic group based on the census parameter value;

determining a second probability of the person being in a total census audience based on the first probability;

determining a pseudo universe estimate based on the first probability, the second probability, and a universe estimate;

determining census audience size totals based on the pseudo universe estimate;

determining census impression count totals based on the impression frequency and the census audience size totals;

determining census duration totals based on census audience size totals and the impression frequency; and performing a subsequent iteration of the solving for the duration value when the census duration totals and the census impression count totals do not satisfy the system of equations;

generate a report including the duration value for the tagged media item; and cause transmission of the report to an end-user computing device, wherein the one or more processors comprise one or more Application Specific Integrated Circuits (ASICs).

8. The audience measurement entity computing system of claim 7, wherein the panel data includes at least one of a total panel audience size of the tagged media item for a single demographic and a single dimension, a total number of the logged demographic impressions of the tagged media item for the single demographic and the single dimension, and a total panel impression duration of the tagged media item for the single demographic and the single dimension.

9. The audience measurement entity computing system of claim 7, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

10. The audience measurement entity computing system of claim 7, the one or more processors are to execute the instructions to set up the first constraint based on panel demographic impression count totals from the panel data and panel audience size totals from the panel data.

11. The audience measurement entity computing system of claim 7, wherein the one or more processors are to execute the instructions to:

determine if the census impression count totals and the census duration totals satisfy the system of equations;

when the census impression count totals and the census duration totals do not satisfy the system of equations, perform a second iteration with a second census parameter value within the first constraint; and when the census impression count totals and the census duration totals satisfy the system of equations, output the census audience size totals, the census impression count totals, and the census duration totals.

12. The audience measurement entity computing system of claim 7, wherein the system of equations corresponds to at least one of (a) a first sum of demographic impressions across demographics or (b) a second sum of durations across the demographics.

13. A method performed by one or more Application Specific Integrate Circuits (ASICs) of an audience measurement entity computing system, the method comprising:

tagging media items with monitoring instructions to cause client devices to transmit, over a network, to the audience measurement entity computing system, beacon requests when the tagged media items are accessed by the client devices, the beacon requests comprising media identifiers of the tagged media items;

receiving the beacon requests via network circuitry of the audience measurement entity computing system, from monitoring devices, and over the network, the monitoring devices configured to monitor the tagged media items accessed by the client devices;

based on the receipt of the beacon requests, determining panel data by logging a record of demographic impressions of the tagged media items, wherein the logging comprises recording the media identifiers in association with panelist demographic information for audience members who were exposed to the tagged media items via the client devices, wherein the panelist demographic information is stored by the audience measurement entity computing system;

returning beacon response messages via the network circuitry to the client devices, wherein the beacon response messages comprise redirect messages that instruct the client devices to send second beacon requests to a database proprietor server;

obtaining, via the network circuitry, from the database proprietor server, database proprietor demographic impressions recorded by the database proprietor server in association with corresponding demographic information provided by the database proprietor server in response to the second beacon requests from registered subscribers of the database proprietor server; and accessing first census data from a server;

setting up a system of equations corresponding to constraints based on the census data; and selecting a census parameter value based on a first constraint of the constraints, the first constraint selected for census parameter selection, the first constraint based on media accesses represented in the panel data;

iteratively solving for a duration value for a tagged media item that satisfies the system of equations using the panel data and the census parameter value to reduce memory and processor resources utilized by the audience measurement entity computing system for determining the duration value for the tagged media item, the duration value corresponding to a duration that the tagged media item was accessed by anonymous audience members in a demographic group, wherein the iteratively solving comprises:

determining an impression frequency of second census data based on the census parameter value;

determining a duration frequency for the second census data;

determining a first probability of a person being in the demographic group based on the census parameter value;

determining a second probability of the person being in a total census audience based on the first probability;

determining a pseudo universe estimate based on the first probability, the second probability, and a universe estimate;

determining census audience size totals based on the pseudo universe estimate;

determining census impression count totals based on the impression frequency and the census audience size totals;

determining census duration totals based on the census audience size totals and the impression frequency; and performing a subsequent iteration of the solving for the duration value when the census duration totals and the census impression count totals do not satisfy the system of equations, the performing of the subsequent iteration being after changing the census parameter value;

generating a report including the duration value for the tagged media item; and transmitting the report to an end-user computing device.

14. The of method claim 13, wherein the panel data includes at least one of a total panel audience size of the tagged media item for a single demographic and a single dimension, a total number of logged panel demographic impressions of the tagged media item for the single demographic and the single dimension, and a total panel impression duration of the tagged media item for the single demographic and the single dimension.

15. The method of claim 13, wherein the first census data includes at least one of a total number of census impressions across multiple demographics and multiple dimensions, a total census audience size across the multiple dimensions and a single dimension, a first total census impression duration across the multiple demographics and the multiple dimensions, and a second total census impression duration across the multiple dimensions and the single dimension.

16. The method of claim 13, further comprising setting up the first constraint based on panel demographic impression count totals from the panel data and panel audience size totals from the panel data.

17. The method of claim 13, wherein the system of equations corresponds to at least one of (a) a first sum of demographic impressions across demographics or (b) a second sum of durations across the demographics.

* * * * *